US009756288B2

(12) United States Patent
Huber et al.

(10) Patent No.: US 9,756,288 B2
(45) Date of Patent: Sep. 5, 2017

(54) TIERING AND MANIPULATION OF PEER'S HEADS IN A TELEPRESENCE SYSTEM

(71) Applicant: THOMSON LICENSING, Issy de Moulineaux (FR)

(72) Inventors: Mark J. Huber, Burbank, CA (US); Mark Leroy Walker, Castaic, CA (US); William Gibbens Redmann, Glendale, CA (US)

(73) Assignee: THOMSON LICENSING, Issy les Moulineaux (FR)

(*) Notice: Subject to any disclaimer, the term of this patent is extended or adjusted under 35 U.S.C. 154(b) by 0 days.

(21) Appl. No.: 14/767,336

(22) PCT Filed: Apr. 10, 2013

(86) PCT No.: PCT/US2013/035981
§ 371 (c)(1),
(2) Date: Aug. 12, 2015

(87) PCT Pub. No.: WO2014/168616
PCT Pub. Date: Oct. 16, 2014

(65) Prior Publication Data
US 2016/0150186 A1    May 26, 2016

(51) Int. Cl.
H04N 7/14        (2006.01)
H04N 7/15        (2006.01)
(Continued)

(52) U.S. Cl.
CPC .............. *H04N 7/15* (2013.01); *G06K 9/0061* (2013.01); *G06K 9/52* (2013.01); *G06T 7/10* (2017.01);
(Continued)

(58) Field of Classification Search
CPC ............................... H04N 7/152; H04N 7/147
(Continued)

(56) References Cited

U.S. PATENT DOCUMENTS 5,548,324 A    8/1996 Downs et al.
5,808,662 A    9/1998 Kinney et al.
(Continued)

FOREIGN PATENT DOCUMENTS

CN    101502111    8/2009
EP    1126709    8/2001
(Continued)

OTHER PUBLICATIONS

Bornat et al., "Smooth Control of Adaptive Media Playout to Acquire IDMS in Cluster-based Applications," 36th Annual IEEE Conf. on Local Computer Networks, LCN 2011, Bonn, 2011 IEEE, pp. 613-621.
(Continued)

*Primary Examiner* — Maria El-Zoobi
(74) *Attorney, Agent, or Firm* — Brian J. Dorini; Robert D. Shedd

(57) ABSTRACT

In a telepresence system, a local station receives images of participants at remote stations processed to isolate the remote participant in the image from image background. The local station merges the images of the participants at the remote stations to generate an output image in which a first remote participant appears to partially overlay another participant. The output image undergoes display at the local station.

22 Claims, 10 Drawing Sheets

(51) Int. Cl.
  *H04N 21/4223* (2011.01)
  *H04N 21/4788* (2011.01)
  *G06K 9/00* (2006.01)
  *G06K 9/52* (2006.01)
  *G06T 7/60* (2017.01)
  *G06T 11/60* (2006.01)
  *G06T 7/10* (2017.01)
  *G06T 7/194* (2017.01)

(52) U.S. Cl.
  CPC .............. *G06T 7/194* (2017.01); *G06T 7/60* (2013.01); *G06T 11/60* (2013.01); *H04N 7/142* (2013.01); *H04N 21/4223* (2013.01); *H04N 21/4788* (2013.01); *G06T 2207/20221* (2013.01); *G06T 2207/30196* (2013.01)

(58) Field of Classification Search
  USPC .......................... 348/14.01–14.09; 709/204
  See application file for complete search history.

(56) References Cited

U.S. PATENT DOCUMENTS

| | | | |
|---|---|---|---|
| 5,896,128 A | 4/1999 | Boyer et al. | |
| 6,653,545 B2 | 11/2003 | Redmann et al. | |
| 6,754,904 B1 | 6/2004 | Cooper et al. | |
| 6,894,714 B2 | 5/2005 | Gutta et al. | |
| 7,236,615 B2 | 6/2007 | Miller et al. | |
| 7,318,051 B2 | 1/2008 | Weston et al. | |
| 7,518,051 B2 | 4/2009 | Redmann | |
| 7,528,860 B2 | 5/2009 | Harville et al. | |
| 7,600,247 B2 | 10/2009 | Onomatsu | |
| 7,620,206 B2 | 11/2009 | Ohba | |
| 7,669,219 B2 | 2/2010 | Scott, III | |
| 7,817,180 B2 | 10/2010 | Jeong et al. | |
| 7,818,770 B2 | 10/2010 | Ducheneaut et al. | |
| 7,849,145 B2 | 12/2010 | Kang et al. | |
| 7,865,834 B1 | 1/2011 | van Os et al. | |
| 7,873,983 B2 | 1/2011 | Ducheneaut et al. | |
| 7,882,530 B2 | 2/2011 | Ducheneaut et al. | |
| 7,921,156 B1 | 4/2011 | Stolorz et al. | |
| 8,060,525 B2 | 11/2011 | Svendsen et al. | |
| 8,126,268 B2 | 2/2012 | Rossato et al. | |
| 8,271,334 B1 | 9/2012 | Funk et al. | |
| 8,417,535 B2 | 4/2013 | Kusumoto et al. | |
| 8,527,334 B2 | 9/2013 | Porter et al. | |
| 8,606,634 B2 | 12/2013 | Porter et al. | |
| 8,677,282 B2 | 3/2014 | Cragun et al. | |
| 8,830,293 B2* | 9/2014 | Mauchly | H04N 7/147 348/14.07 |
| 8,957,918 B2 | 2/2015 | Godavari | |
| 9,490,998 B1 | 11/2016 | Danciu et al. | |
| 2002/0099774 A1 | 7/2002 | Yamato et al. | |
| 2002/0138831 A1 | 9/2002 | Wachtfogel et al. | |
| 2004/0003413 A1 | 1/2004 | Boston et al. | |
| 2004/0015999 A1 | 1/2004 | Carlucci | |
| 2004/0054577 A1 | 3/2004 | Inoue | |
| 2004/0080611 A1* | 4/2004 | Kakii | G09B 5/06 348/14.16 |
| 2004/0194131 A1 | 9/2004 | Ellis | |
| 2005/0091311 A1 | 4/2005 | Lund et al. | |
| 2006/0013557 A1 | 1/2006 | Poslinski | |
| 2006/0136960 A1 | 6/2006 | Morris | |
| 2006/0174312 A1 | 8/2006 | Ducheneaut et al. | |
| 2006/0218577 A1 | 9/2006 | Goodman et al. | |
| 2006/0236352 A1 | 10/2006 | Scott, III | |
| 2006/0282856 A1 | 12/2006 | Errico et al. | |
| 2007/0022375 A1 | 1/2007 | Walker | |
| 2007/0039449 A1 | 2/2007 | Redmann | |
| 2007/0055566 A1 | 3/2007 | Gaughan | |
| 2007/0156520 A1 | 7/2007 | Sharma | |
| 2007/0157114 A1 | 7/2007 | Bishop | |
| 2007/0266400 A1 | 11/2007 | Rogers et al. | |
| 2008/0103879 A1 | 5/2008 | Armstrong | |
| 2008/0133647 A1 | 6/2008 | Hamzeh | |
| 2008/0168505 A1 | 7/2008 | Saito et al. | |
| 2008/0249961 A1 | 10/2008 | Harkness et al. | |
| 2008/0266380 A1* | 10/2008 | Gorzynski | H04N 7/15 348/14.08 |
| 2008/0307412 A1 | 12/2008 | Marr et al. | |
| 2009/0024718 A1 | 1/2009 | Anagnostopoulos | |
| 2009/0033737 A1 | 2/2009 | Goose et al. | |
| 2009/0109278 A1 | 4/2009 | Karnalkar et al. | |
| 2009/0132356 A1 | 5/2009 | Booth et al. | |
| 2009/0133069 A1 | 5/2009 | Conness | |
| 2009/0169171 A1 | 7/2009 | Massey et al. | |
| 2009/0215538 A1 | 8/2009 | Jew | |
| 2009/0232285 A1 | 9/2009 | Mani | |
| 2009/0240771 A1 | 9/2009 | Capobianco | |
| 2009/0251599 A1 | 10/2009 | Kashyap et al. | |
| 2009/0293079 A1 | 11/2009 | McKee et al. | |
| 2009/0307047 A1 | 12/2009 | Cook et al. | |
| 2009/0315974 A1 | 12/2009 | Matthews | |
| 2009/0328122 A1 | 12/2009 | Amento et al. | |
| 2010/0030648 A1 | 2/2010 | Manolescu et al. | |
| 2010/0043020 A1 | 2/2010 | Basso | |
| 2010/0066804 A1 | 3/2010 | Shoemake et al. | |
| 2010/0082727 A1 | 4/2010 | Zalewski | |
| 2010/0085416 A1 | 4/2010 | Hegde et al. | |
| 2010/0100923 A1 | 4/2010 | Toiyama | |
| 2010/0114692 A1 | 5/2010 | Steelberg et al. | |
| 2010/0131385 A1 | 5/2010 | Harrang et al. | |
| 2010/0153577 A1 | 6/2010 | Wohlert et al. | |
| 2010/0171807 A1* | 7/2010 | Tysso | H04N 7/152 348/14.09 |
| 2010/0171848 A1 | 7/2010 | Peters et al. | |
| 2010/0199310 A1 | 8/2010 | Newell | |
| 2010/0223119 A1 | 9/2010 | Klish | |
| 2010/0302446 A1* | 12/2010 | Mauchly | H04N 7/147 348/598 |
| 2010/0318405 A1 | 12/2010 | Kirkby | |
| 2011/0040634 A1 | 2/2011 | Landsberry et al. | |
| 2011/0050995 A1 | 3/2011 | Ozawa et al. | |
| 2011/0090302 A1 | 4/2011 | Leviav et al. | |
| 2011/0117532 A1* | 5/2011 | Relyea | G01J 3/02 434/307 R |
| 2011/0131616 A1 | 6/2011 | Cho | |
| 2011/0138018 A1 | 6/2011 | Raveendran et al. | |
| 2011/0145881 A1 | 6/2011 | Hartman et al. | |
| 2011/0154386 A1 | 6/2011 | Cochinwala et al. | |
| 2011/0191288 A1 | 8/2011 | Spears | |
| 2011/0218656 A1 | 9/2011 | Bishop et al. | |
| 2011/0261142 A1* | 10/2011 | Shanmukhadas | H04N 7/15 348/14.1 |
| 2011/0264532 A1 | 10/2011 | Chan et al. | |
| 2011/0316853 A1* | 12/2011 | Bar-Zeev | G06T 15/20 345/420 |
| 2012/0026277 A1 | 2/2012 | Malzbender et al. | |
| 2012/0038742 A1 | 2/2012 | Robinson et al. | |
| 2012/0166349 A1 | 6/2012 | Dedis | |
| 2012/0239506 A1 | 9/2012 | Sanders | |
| 2012/0257112 A1 | 10/2012 | Fritsch | |
| 2012/0314077 A1* | 12/2012 | Clavenna, II | H04N 21/2187 348/159 |
| 2013/0030987 A1 | 1/2013 | Zuckerberg | |
| 2013/0076980 A1 | 3/2013 | Oren et al. | |
| 2013/0173742 A1 | 7/2013 | Thomas et al. | |
| 2013/0282454 A1 | 10/2013 | Alpert et al. | |
| 2013/0290098 A1 | 10/2013 | Steelberg | |
| 2013/0303591 A1 | 11/2013 | Brown et al. | |
| 2013/0304582 A1 | 11/2013 | Beasley | |
| 2013/0347033 A1 | 12/2013 | Grab | |
| 2014/0139620 A1 | 5/2014 | Redmann et al. | |
| 2014/0215535 A1 | 7/2014 | Elliott et al. | |
| 2015/0074716 A1 | 3/2015 | Redmann | |
| 2015/0089372 A1 | 3/2015 | Mandalia et al. | |
| 2015/0095931 A1 | 4/2015 | Duong et al. | |
| 2015/0199727 A1 | 7/2015 | Naveh | |
| 2016/0014371 A1* | 1/2016 | Huber | H04N 7/144 348/14.07 |

(56) References Cited

U.S. PATENT DOCUMENTS

FOREIGN PATENT DOCUMENTS

| EP | 2202970 | 6/2010 |
|---|---|---|
| JP | 1997282133 | 10/1997 |
| JP | 2002218277 | 8/2002 |
| JP | 2003163911 | 6/2003 |
| JP | 2004135062 | 4/2004 |
| JP | 2006041885 | 4/2006 |
| JP | 2006108947 | 4/2006 |
| JP | 2006345121 | 12/2006 |
| JP | 2010206349 | 9/2010 |
| JP | 2011114870 | 6/2011 |
| KR | 812903 | 3/2008 |
| KR | 939904 | 2/2010 |
| KR | 20110125548 | 11/2011 |
| WO | WO2004032507 | 4/2004 |
| WO | WO2012008972 | 1/2012 |
| WO | WO2012162721 | 12/2012 |
| WO | WO2013019259 | 2/2013 |
| WO | WO2013103583 | 7/2013 |

OTHER PUBLICATIONS

Zarros et al., "Interparticipant Synchronization in Real-Time Multimedia Conferencing Using Feedback," IEEE/ACM Transactions on Networking, vol. 4, No. 2, Apr. 1996, New York, NY, USA, pp. 173-180.

Fan et al., "Learning to Predict Ad Clicks Based on Boosted Collaborative Filtering," IEEE Int'l. Conf. on Social Computing/IEEE Int'l. Conf. on Privacy, Security, Risk and Trust, 2010 IEEE, pp. 209-216.

Han et al., "Four-way Video Conference in Home Server for Digital Home," 2006 IEEE, 6 pages.

Ishikawa et al., "The design of a set-top box with video encoder and its application to video conferencing," EUROPTO Symposium on Broadband European Networks, Zurich, Switzerland, May 1998, SPIE vol. 3408, pp. 592-602.

Pan et al., "Real-Time Collaborative Video Watching on Mobile Devices with REST Services," 2012 Third FTRA Int'l. Conference on Mobile, Ubiquitous, and Intelligent Computing, 2012 IEEE, pp. 29-34.

Levent-Levi, "What Layouts Should a Dual Video System Support VoIP Survivor," http://blog.radvision.com/voipsurvivor/2009/12/07/what-layouts-should, Dec. 7, 2009, 3 pages.

"Syncplay client source code", Gitl-Iub.com, Feb. 18, 2012 (retrieved on Oct. 27, 2105). Retrieved from the Internet: <URL:https://githut.com/fluxid/syncplay/blob/master/syncplay/client.py>.

Goderbauer et al.: "Syncro-Concurrent Editing Library for Google Wave", Int'l Conference on Web Engineering (ICWE) 2010, vol. 6189, 2010, pp. 510-513 (retrieved on Mar. 10, 2017). Retrieved from SpringerLink. DOI: 10.1007/978-3-642-13911-6_40.

\* cited by examiner tations with each other across conventional networks without requiring inordinately high bandwidth. Present day video conference systems typically include one or more individual monitors, each displaying images from cameras at one or more remote locations. In the event of multiple remote cameras, a video conference monitor will typically display the image capture by each remote camera in a separate window. Displaying the individual camera images in separate windows leads to unattractive tiling of the display screen, and results in large amounts of wasted screen space allocated to the gaps between people (or windows) and lots of background images. Because of the wasted space, the video conference participants in such a display appear much smaller than life-size. For this reason, typical video conference systems employ a nearly room-sized screen or a collection of large monitors in order to provide a life-sized display of the participants.

TIERING AND MANIPULATION OF PEER'S HEADS IN A TELEPRESENCE SYSTEM

TECHNICAL FIELD

This application is a National Stage Application and claims the benefit, under 35 U.S.C. §365 of International Application PCT/US2013/035981 filed Apr. 10, 2013 which was published in accordance with PCT Article 21(2) on Oct. 16, 2014 in English.

BACKGROUND ART

Advances in video equipment and network transmission has led to the development of affordable video conference systems that enable individuals, or groups of individuals, at separate locations to share video images and audio information with each other across conventional networks without requiring inordinately high bandwidth. Present day video conference systems typically include one or more individual monitors, each displaying images from cameras at one or more remote locations. In the event of multiple remote cameras, a video conference monitor will typically display the image capture by each remote camera in a separate window. Displaying the individual camera images in separate windows leads to unattractive tiling of the display screen, and results in large amounts of wasted screen space allocated to the gaps between people (or windows) and lots of background images. Because of the wasted space, the video conference participants in such a display appear much smaller than life-size. For this reason, typical video conference systems employ a nearly room-sized screen or a collection of large monitors in order to provide a life-sized display of the participants.

Recently, video conferencing has become available for consumer use in the form of a telepresence system that allows subscribers of network-supplied content, such as cable television subscribers, to view shared content among themselves while simultaneously exchanging images of each other. For ease of discussion, the term "participants" will identify such network system subscribers that participate in a telepresence system session. The same problem of displaying individual video images on a single monitor incurred by commercial video conference systems also plagues consumer telepresence systems. However, the solutions employed to address this problem in commercial video conference systems, such as large screen monitors, are impractical for use in a consumer telepresence environment.

Thus, a need exists for a technique for realistically displaying the images of telepresence system participants.

BRIEF SUMMARY OF THE INVENTION

Briefly, a method for displaying at a local station images of participants at remote stations, commences by establishing at the local station the images of the participants at the remote stations processed to isolate such remote participant in the image from image background At the local station, the processed images of the participants at the remote stations are merged to generate an output image in which a first processed participant image appears to partially overlay another second processed participant image. The output image undergoes display on a display device at the local station.

DETAILED DESCRIPTION

Figure 1:
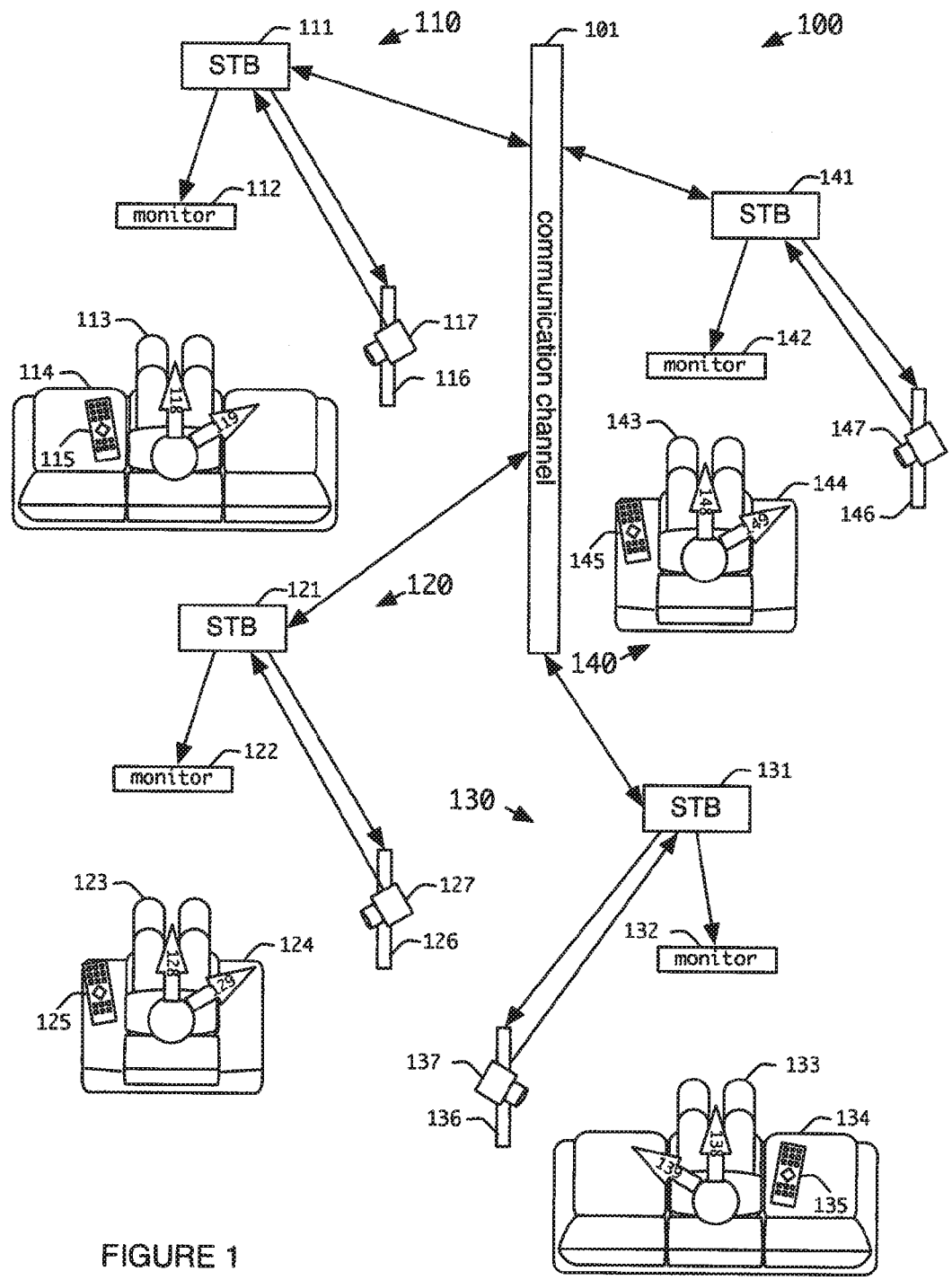
FIG. 1 depicts a block diagram of telepresence system having four stations for practicing the display technique of the present principles.

FIG. 1 depicts a block schematic diagram of a telepresence system 100 having four stations 110, 120, 130, and 140, each deployed at a particular location, for example a residential or commercial premises. Each of the stations 110, 120, 130, and 140 serves a separate one of participants 113, 123, 133, and 143, respectively, (sometimes referred to as users, viewers, or audience members). At each of the stations 110, 120, 130, and 140, each of participants 113, 123, 133, and 143, respectively, watches shared content (i.e., content viewed substantially simultaneously by all the participants, e.g., a football game being broadcast) on a separate one of the shared content monitor 112, 122, 132, and 142, respectively, while situated on one of couches or chairs 114, 124, 134, and 144, respectively. Each of participants 113, 123, 133, and 143 uses a separate one of remote controls 115, 125, 135, and 145, respectively, to operate a corresponding one of set-top boxes (STBs) 111, 121, 131, and 141, respectively. As described in detail with respect to FIG. 9, each of the set-top boxes 111, 121, 131, and 141, at the stations 110, 120, 130, and 140, respectively, controls the display of shared content displayed on a corresponding one of the shared content monitors 112, 122, 132, and 142, respectively.

Note that while discussion of the present principles to the illustrated embodiment of FIG. 1, which relies on like STBs at each station, this merely embodiment serves as an example, not by way of limitation. Implementation of the present can occur using inhomogeneous equipment at any station, which may include a dedicated telepresence appliance not associated with the shared content display, a desktop-, laptop-, or tablet computer, or a smart phone, as long as such equipment provides the functions of the telepresence camera, telepresence display, communications connection, and processing, all discussed below.

Each STB has a connection to a communication channel 101 typically operated by a network service operator, such as a cable television operator or telecommunications company. The communications channel 101 could exist as part of a proprietary network maintained by the network service operator. Alternatively, the communications channel could comprise a broadband connection to the Internet, as offered by an Internet Service Provider (ISP). The communication channel 101 enables the STBs 111, 121, 131, and 141 to exchange audio, video and/or information with each other, with or without intermediation by a server (not shown), as well as to obtain content from one or more content sources (not shown).

Each of the STBs 111, 121, 131, and 141 receives incoming video from a corresponding one of the telepresence cameras 117, 127, 137, and 147, respectively, situated at the stations 110, 120, 130, and 140, respectively, for capturing the image of a corresponding one of the participants 113, 123, 133, and 143, respectively at each station. Further, each of the STBs 111, 121, 131, and 141 receives video from the other STBs of the corresponding remote participants for display on a corresponding one of telepresence monitor 116, 126, 136, and 146, respectively. For ease of discussion, the term "local participant" refers to the participant whose image undergoes capture by the telepresence camera at a given station for display on the telepresence monitor at one or more distant stations. Conversely, the term "remote participant" refers to a participant associated with another station (i.e., a "remote station") whose image undergoes display on the telepresence monitor of the local participant.

Typically, at each of the stations 110, 120, 130, and 140, each of the participants 113, 123, 133, and 143, respectively, will sit directly in front of a corresponding one of the shared content monitor 112, 122, 132, and 142, respectively. Thus, each of the participants 113, 123, 133, and 143 has a particular orientation or facing 118, 128, 138, and 148, respectively, with respect to his/her corresponding shared content monitor. At each of the stations 110, 120, 130 and 140, the telepresence cameras 117, 127, 137, and 147, respectively, and telepresence monitors 116, 126, 136 and 146, respectively, lie to one the side of the participant at that station. Thus, with respect his/her corresponding telepresence camera/telepresence monitor pair, each of the participants 113, 123, 133 and 143 has a particular one of facings 119, 129, 139, and 149, respectively. In some cases, the telepresence monitor and telepresence camera pair lie to the left of the shared content monitor, as at the station 130. Conversely, at the stations 110, 120, and 140, the telepresence monitor/telepresence camera pair lie to the right of the shared content monitor. In practice, the STBs can exchange information with other about the facing of their respective participants relative to their corresponding telepresence monitor/telepresence camera pair. Alternatively, the STBs 111, 121, 131 and 141 of FIG. 1 can interact by assuming a predetermined facing (e.g., providing and handling telepresence video streams as if they originated from telepresence cameras lying on a particular side of the participant, e.g., to a participant's right when the participant faces the shared content monitor).

Figure 2:
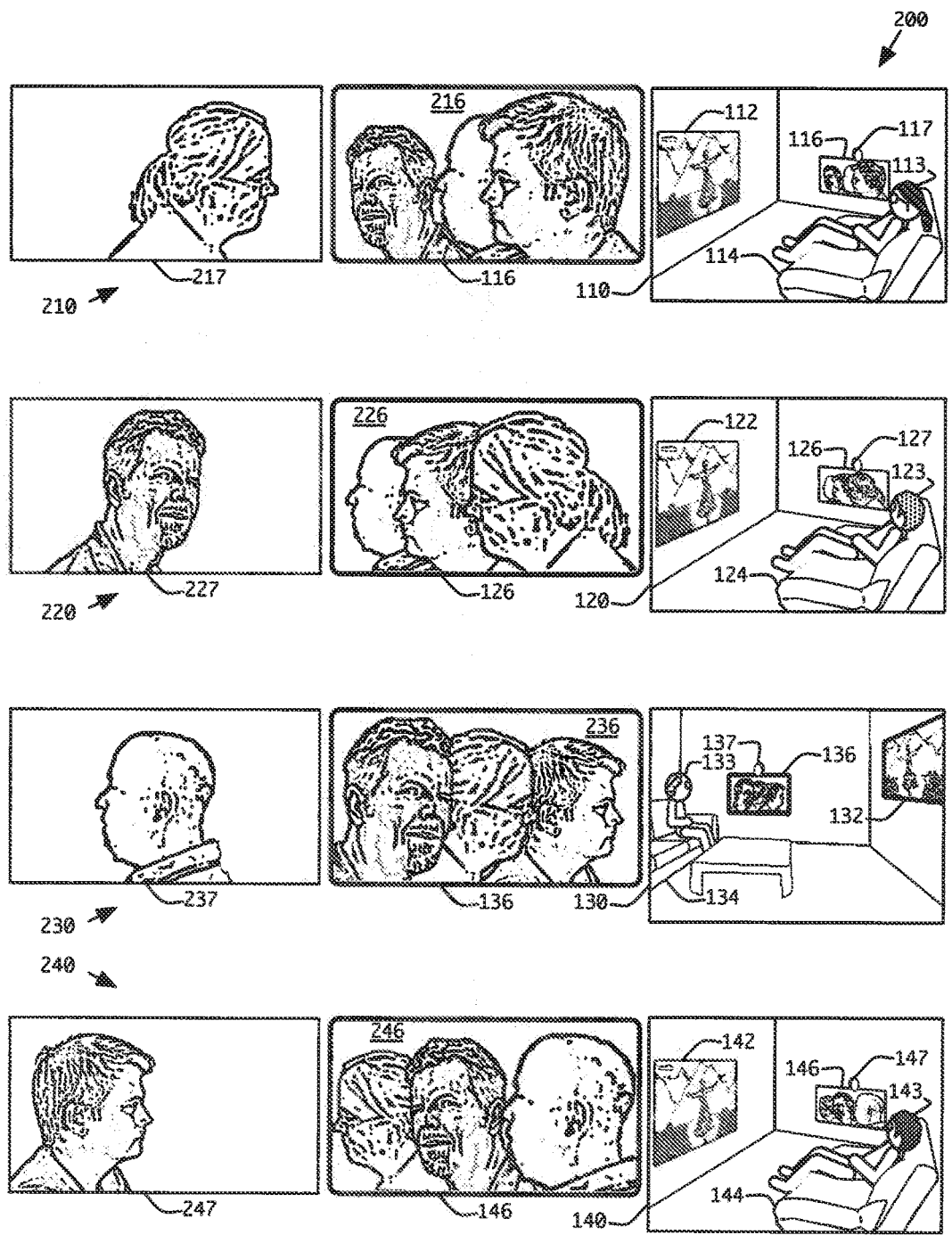
FIG. 2 depicts four situations, each corresponding to the operation of a separate one of the four telepresence stations of FIG. 1.

FIG. 2 depicts an aggregate situation 200 comprised of four individual situations 210, 220, 230, and 240, each representative of the operation of a separate one of the four telepresence stations 110, 120, 130, and 140. At each of the stations 110, 120, 130, and 140 depicted in FIG. 2, shared content plays out in substantial synchronization on a separate one of the shared content monitors 112, 122, 132, and 142, respectively. The participants 113, 133, and 143 at the stations 110, 130 and 140, respectively, are currently facing their corresponding shared content monitor, while the participant 123 at station 120 faces his/her corresponding telepresence monitor 126 and co-located telepresence camera 127. The telepresence cameras 117, 127, 137, and 147 capture the images 217, 227, 237, and 247, respectively, of the participants 113, 123, 133 and 143, respectively. For ease of reference, such images bear the designation "telepresence images." In the situations 210, 230, 240, corresponding to the stations 110, 130 and 140, respectively, when participants 113, 133, and 143 watch their corresponding shared content monitors, the telepresence camera images 217, 237, and 247 will depict the corresponding participants in profile. The situation 220 associated with the operation of the station 120 depicts the participant 123 facing his/her telepresence camera/telepresence monitor pair 127/126. Thus, the telepresence camera image 227 depicts the participant 123 directly facing his/her telepresence camera so as to appear substantially straight on, rather than in profile.

Each of the telepresence monitors 116, 126, 136, and 146 displays a corresponding one of the composite images 216, 226, 236, and 246, respectively. Each composite image displayed on the corresponding telepresence monitor of a local participant includes the telepresence images of the remote participants. For the illustrated embodiment of FIG. 1, which includes the four stations 110, 120, 130, and 140, each local telepresence monitor depicted in the situation 200 of FIG. 2 displays the images of the three remote telepresence cameras. For example, at the station 110 depicted in the situation 210, the telepresence monitor 116 displays the composite image 216 comprised of at least a portion of the images 227, 237, and 247 captured by the telepresence cameras 127, 137, and 147. However, the composite image 216 displayed by telepresence monitor 116 at the station 110 does not include the telepresence image 217 from camera 117, because that telepresence image is local with respect to that telepresence monitor.

As discussed in applicants' co-pending applications PCT/US11/063036, PCT/US12/050130, PCT/US12/035749, and PCT/US13/24614, (all incorporated by reference herein), the telepresence images 217, 227, 237, and 247 may or may not require horizontal flipping before undergoing display on their corresponding remote telepresence monitors. The need to horizontally flip the telepresence image depends on the relative orientation (i.e., facing) of the participant to the telepresence camera at that station. In other words, whether the telepresence image undergoes flipping depends on whether the participant needs to turn right or left to face his/her telepresence camera straight on. When two stations have opposite facings (as do stations 220 and 230), no flipping is needed to correctly display each other's telepresence image, but when two stations have a common facing (as do stations 220 and 240), then horizontal flipping is needed for each to properly display the others' telepresence image. For example, the telepresence image 227 requires horizontal flipping prior to display on the remote telepresence monitors 116 and 146, because the facing 129 at station 120 is rightward, as are facings 119 and 149 at stations 110 and 140. However, the telepresence image 227 does not require horizontal flipping prior to display on the telepresence monitor on 136 because the facing 129 at the station 120 is rightward and facing 139 at station 130 is the opposite (leftward). (In other words, in the case of the stations 100, 120 and 140, each of the corresponding participants 113, 123 and 143, respectively will turn in the same direction (e.g., rightward with respect to the shared content monitor, as seen in FIG. 1) to face his/her respective telepresence camera. However, at the stations 120 and 130, the participants 123 and 133, respectively must turn in opposite directions (e.g., right and left, respectively, with respect to their shared content monitors, as seen in FIG. 1) to face their corresponding telepresence cameras. Thus, the stations 120 and 130 have opposite facings. This resembles a physical situation in which two individuals are sitting on a couch watching TV: The person on the left must turn rightward to face the person on the right, while the person on the right must turn leftward. Because a telepresence monitor can be placed to either side of the shared content monitor, the telepresence facings are not constrained by that physical situation. Instead, the physical situation is simulated, if needed, by providing a mirror image of a remote participant whenever the telepresence camera placements do not conform to the analogous physical situation.

In the exemplary embodiment of FIG. 1, the station 130 has a facing opposite to all of the other stations. For this reason, the telepresence image 237 originating from the station 130 need not undergo horizontal flipping when displayed on the remote telepresence monitors 116, 126, and 146, as seen in the composite images 216, 226, and 246 of FIG. 2.

Figure 3:
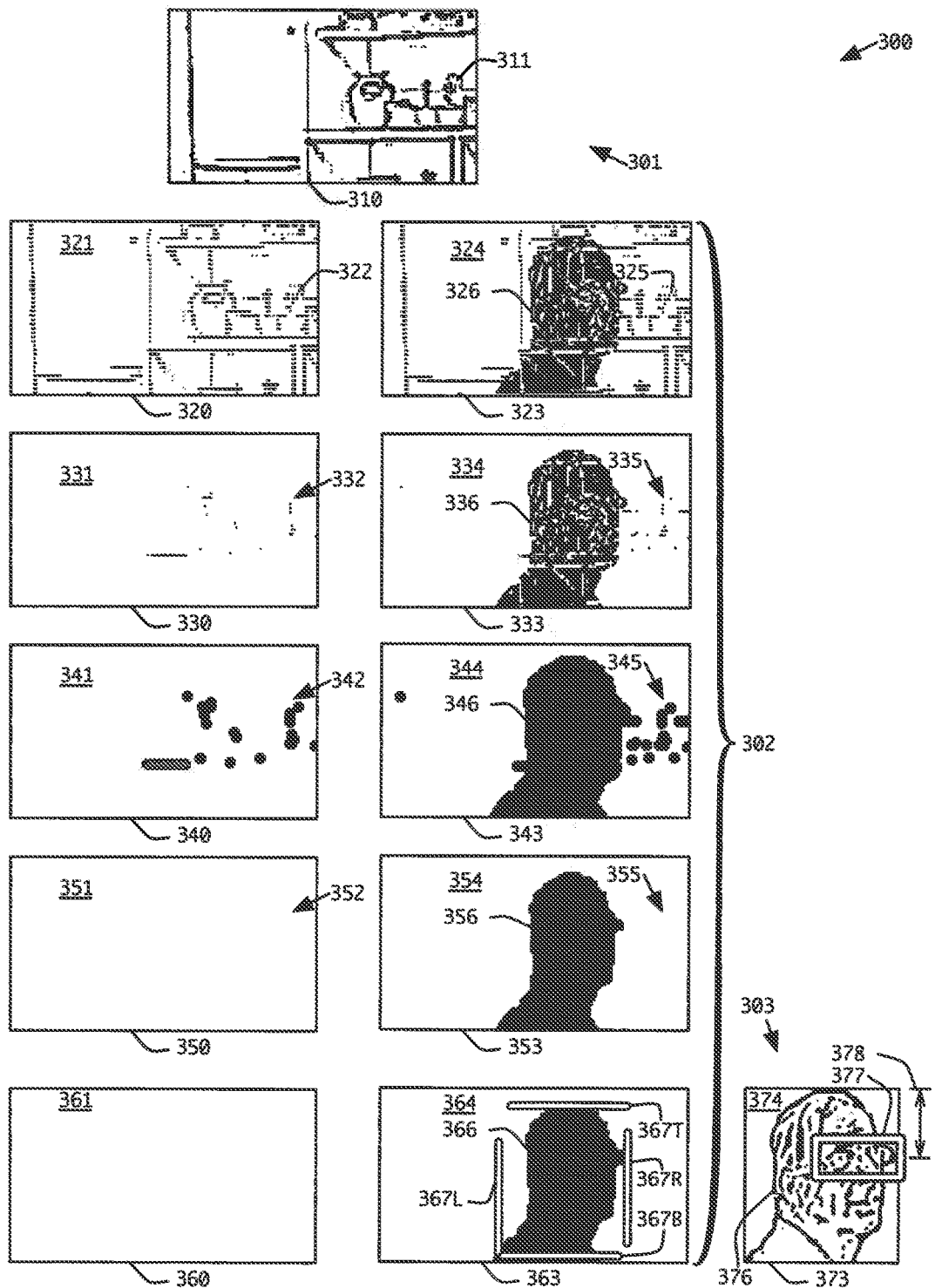
FIG. 3 depicts a sequence of images associated with a first exemplary process for separating the head of a participant from the background image and establishing metadata for each participant image.

In order to create the composite images 216, 226, 236, and 246, each of the telepresence images 217, 227, 237, and 247 requires processing to isolate the participant's head from the background in that telepresence image. A number of image processing techniques exist for separating an object from a static background, as surveyed by Cheung, et al, in their article *Robust techniques for background subtraction in urban traffic video, Proceedings of Electronic Imaging: Visual Communications and Image Processing,* 2004, WA, SPIE. (5308):881-892. FIG. 3 depicts a sequence of images associated with a first exemplary process 300 for separating the head of a participant from the background image and establishing metadata for each participant's image. Step 301 in FIG. 3 constitutes the first step in an overall process of obtaining one or more images from a telepresence camera, for example, telepresence camera 117 of FIG. 1. The process also produces an image 310 having a background characterized by static background objects (e.g., object 311) represented by pixels having substantially the same value for the preponderance of observations when monitored over a period of time. Thus, step 301 includes the sub-steps of identifying and recording a value for each pixel so that background image 310 substantially models the static background with high confidence. In an exemplary embodiment, a participant will receive a prompt to evacuate the field of view of telepresence camera 117 and a single image of the unoccupied room taken by the corresponding telepresence camera can serve as the background image 310. More sophisticated algorithms can dynamically accumulate pixels for the background image 310 by monitoring which value or range or collection of values represents an individual pixel most of the time, usually over an interval longer than a person will likely to sit still (e.g., several minutes or hours). Other algorithms can build and track object models, for example placing an object (e.g., a book) into a scene and quickly observing the object as constituting something static rather than a participant (e.g., by color or scale), and thereby quickly classifying the object as a background object and thus a part of background image 310.

In some embodiments, capturing the background occurs over time to enable modeling of the background as pixels that do not change, except slowly, other than when a participant appears in the frame, or nearby, or the lighting changes suddenly (e.g., when a participant turns on a lamp or opens a shade for example.) The background image 310 can undergo time averaging to reduce noise, and can undergo recording to provide multiple background models, for example under different lighting conditions. For example, modeling of the background can occur by noting the pixels whose color value and luminance value only change slowly over time (e.g., a minute), if at all. When the pixel values do change, e.g., as occurs when someone walks by, the pixels eventually return to their prior value, e.g., as when the person has passed by. When a new object first appears in the scene, or a previously existing object gets removed, these changes appear transient but eventually become the new background value. The transition from a transient object to a background object may occur at a predetermined rate and may differ in different regions of the image. Other more sophisticated techniques can supplement the above-described process whereby the modeling process establishes textures and artifacts (e.g., edges, corners) that establish the nature of the background so that pixels representing the background might undergo recognition in subsequent images generated by the telepresence camera 117.

The foregoing discussion regarding isolation of static background images presumes the telepresence camera 117 remains static and so the background objects identified in the background image 310 remain consistent throughout FIG. 3, but this is not strictly necessary. In some embodiments, the telepresence camera 117 could possess the ability to mechanically or electronically pan and/or tilt, e.g., to better accommodate various seating positions or movements of the participant 113. In such embodiments, the background image isolation process would include a further step (not shown) to correlate the current orientation of the camera 117 with the appropriate portion of the background model represented by the background image 310, where the whole of the background model could be larger than represented by background image 310.

With the background so modeled by the background image 310, then during the participant isolation step 302, subtraction of the background image from the current image can occur with the goal of identifying which pixels belong to the background, and which belong to non-static objects, which in this environment should be substantially just the participant.

In FIG. 3, there are two separate, parallel examples of participant isolation step 302, illustrated as two columns of images. The left column with images 320, 330, 340, 350, and 360 depict the participant isolation step 302 when no participant is present, while the right column with images 323, 333, 343, 353, and 363 depicts the participant isolation step 302 with one participant present.

At the start of participant isolation step 302, in the left column, when the current image from telepresence camera 117 constitutes an unpopulated view of the background determined during step 301, the resulting difference image 320 comprises a substantially empty field 321 where only a slight residual signal remains, e.g., residual signal 322, corresponding to static background object 311. Consider that for this moment, the current video image (not shown) looks substantially like the image 310 and that when background image 310 gets subtracted from a substantially similar image, only a slight residual value remains as shown. For a static background, such a residual value appears most pronounced near the high-contrast edges in background image 310. Under such conditions, minute variations in the camera position (as might be caused by vibration or changes in temperature) or lighting (as might be caused by the phase interaction between the exposure interval of camera 117 and the electrical service powering the lights) produce the greatest differential change in adjacent pixel values from one image to the next.

In this case, the image subtraction process subtracts the value of a pixel in the background model from the value of the corresponding pixel in the current image. Only the magnitude of the result warrants consideration so if the pixel has a current value only slightly more or less than its value in the background, then the subtraction produces a result that might be zero, or a small positive or negative value near zero. Since only the magnitude warrants consideration, the result is zero or a small, but positive, value. The subtraction occurs separately for each of the primary colors (i.e., red, green, blue). In some embodiments, a difference in one primary color (e.g., the green) for a pixel will undergo weighting more heavily than a difference for the other colors (e.g., red and blue) due to different camera sensitivities.

Note, throughout FIG. 3, the images selected for illustration make the content most clearly visible, as depicted by black details on white background. Traditionally in image processing, a subtraction process would produce a substantially black frame (because most values are at or near zero), with slightly non-black details. However, this would result in an image difficult to present with any clarity. As such, the images in FIG. 3, other than image 310, appear inverted, showing black details within a substantially white field for purposes of clarity.

In a separate instance of participant isolation during step 302, in the right column, where, for example, the participant 113 has entered the scene and appears in the current image (not shown, though similar to camera image 217, but with the imaged participant facing the camera) produced by the telepresence camera 117, the corresponding difference image 323 between the current video image and the background image 310 (or model) results in the region 326 being substantially non-empty, that is, region 326 comprises many pixels representing a difference-magnitude of values substantially greater than zero. This region 326 corresponds substantially to the region in the current image that represents participant 113, while the background area 324 remains substantially empty where the difference from the static background objects is substantially zero, thus leaving only a residual signal, e.g., residual object signal 325. Generally, the difference results 320 and 323 undergo image processing to refine the current candidate participant region 326 to provide a better estimate of where the participant's image resides (if present at all) in the current image. The results of a such sequence of operation appears in images 330, 340, 350, and 360 for a current video image where participant 113 does not appear, and in images 333, 343, 353, and 363 for a current video image where participant 113 does appear. This exemplary sequence of image processing operations includes thresholding, dilation, erosion, and dilation again, though more, fewer, or different operations could occur using the same or different operating parameters.

In images 330 and 333, the thresholding operations serve to whiten any pixels in the corresponding difference image (320, 323) having a difference magnitude less than a predetermined valued (i.e., where the current video pixel's value substantially equals the same pixel's value in the background image 310). These operations also set the rest of the pixels to black (i.e., where a current video pixel substantially differs from the background). This generally eliminates most of the remnant signal 322/325 corresponding to background objects 311. As a result, only a small residual signal 332/335 remains within the otherwise empty background fields 331/334, and the candidate participant region 336 become more definite.

The dilation process expands marked (black) regions and conversely, reduces empty (white) regions. The degree of this expansion, as measured in pixels, generally remains predetermined, but could dynamically vary based on effectiveness in iterative attempts to refine the candidate region. Described another way, each unmarked (white) pixel lying within a predetermined distance of any marked (black) pixel, becomes marked (black). In this example, the predetermined dilation value equals two pixels. Thus, in images 340 and 343, the background (white) regions 341/344 become slightly reduced, while the residual signals 342/345 (which are black) become slightly enlarged. The candidate region 346 (also black) becomes slightly enlarged, but gaps and hairlines previously riddling the candidate region 336 substantially disappear.

The erosion operation constitutes the reverse of dilation. Erosion unmarks (removes) each marked (black) pixel lying within a predetermined distance from any empty (white) pixels, causing such previously black pixels to become white. The erosion operation has the effect of deleting black features smaller than about twice the predetermined size (in pixels), turning them white. Erosion also has the effect of removing stray black pixels or narrow black lines which may still remain near high-contrast edges that may have locally increased the likely magnitude of residual difference value, e.g. along the edge of a shelf or doorway. In this example, the predetermined erosion value equals three pixels, selected to be greater than the two pixel valued used in the first dilation. As a result, in the images 350/353, the background (white) regions 351/354 appear substantially empty because of elimination of the residual signals 342/345 at 352/355. All that remains is the candidate region 356.

Because the erosion operation uses a slightly larger value (three pixels) than did the dilation operation (two pixels), the candidate region 356 may become smaller than appropriate. Application of a second dilation step, using a value of one pixel, can correct this problem. In image 360, this second dilation operation causes no change to empty background 361, because there were no black pixels to dilate. In the image 363, surrounded by empty (white) background region 364, the candidate region 366 becomes slightly larger than the region 356 and should substantially correspond to the pixels presenting the image of participant 113 in the current image generated by the telepresence camera 117.

Overall, careful selection of the sequence of image processing operations and the parameters used therein should substantially achieve the results described above. In other embodiments, different sequences of erosion and dilation could provide similar results. In still other embodiments, other image processing techniques could serve to match features within the image to models of generic heads or to images of generic or particular heads (e.g., photos of expected participants), or to captured images of prior participants. Such feature-based techniques may produce better results given an appropriate model or collection of reference images.

During step 303, upon detecting the presence of a participant (as might be determined by having region 366 comprising at least a predetermined number of pixels), the current image undergoes cropping and scaling and the background is made transparent. A simple analysis of candidate region 366 can identify the top, left, right, and bottom extents (367T, 367L, 367R, 367B), for example as determined by the left and rightmost columns and top and bottom-most rows having at least a predetermined number of marked pixels. Such extents can serve to determine a cropping of the current image suitable to isolate the participant image 373 within the current image. Pixels in the isolated participant image 373, corresponding to portions of background region 364 contained within the extents 367T/L/R/B, can serve to force pixels in participant image 373 to become transparent. Thus, in the participant image 373, generally, the pixels represent the participant region 376 (and thus show the participant), or they belong to the transparent background 374. Note that if the candidate region 366 appears too small, i.e., comprises too-few columns or too-few rows when compared to a set of predetermined limits, as might be the case if an animal entered the field of view, then the STB could ignore the candidate participant region 366 and treat the participant as absent, as with the empty image 360.

When the participant 113 faces his or her telepresence camera 117, as is the case in isolated participant image 373, facial recognition software executed the STB 111 can identify the participant's eye region 377, and such software can determine the normalized half-head height 378 in accordance with the distance between the horizontal midline of eye region 377 and the top of the participant's head (corresponding to extent 367T). As long as the participant 113 remains in approximately the same position (e.g., sitting in the same seat on the couch 114), then the half-head height value 378 will remain substantially the same, but could undergo averaging over multiple measurements to minimize the influence of noise present in a single measurement.

However, before participant 113 faces the telepresence camera 117, or before the facial recognition software has identified the participant's eye region 377, the STB 111 could obtain an estimate of half-head height 378 from half the distance between top and bottom extents 367T and 367B. Alternatively, the STB 111 could make use of a previous value for the half-head height obtained during a prior session. In a case where the value for half-head height 378 suddenly undergoes updating (for example, when an estimate no longer becomes necessary because the STB 111 has obtained an actual measurement of the half-height 378 or when a noisy initial measurement becomes refined by subsequent measurements), any display process using the half-head height value should transition to the new value gradually, to avoid sudden changes in the display.

Figure 4:
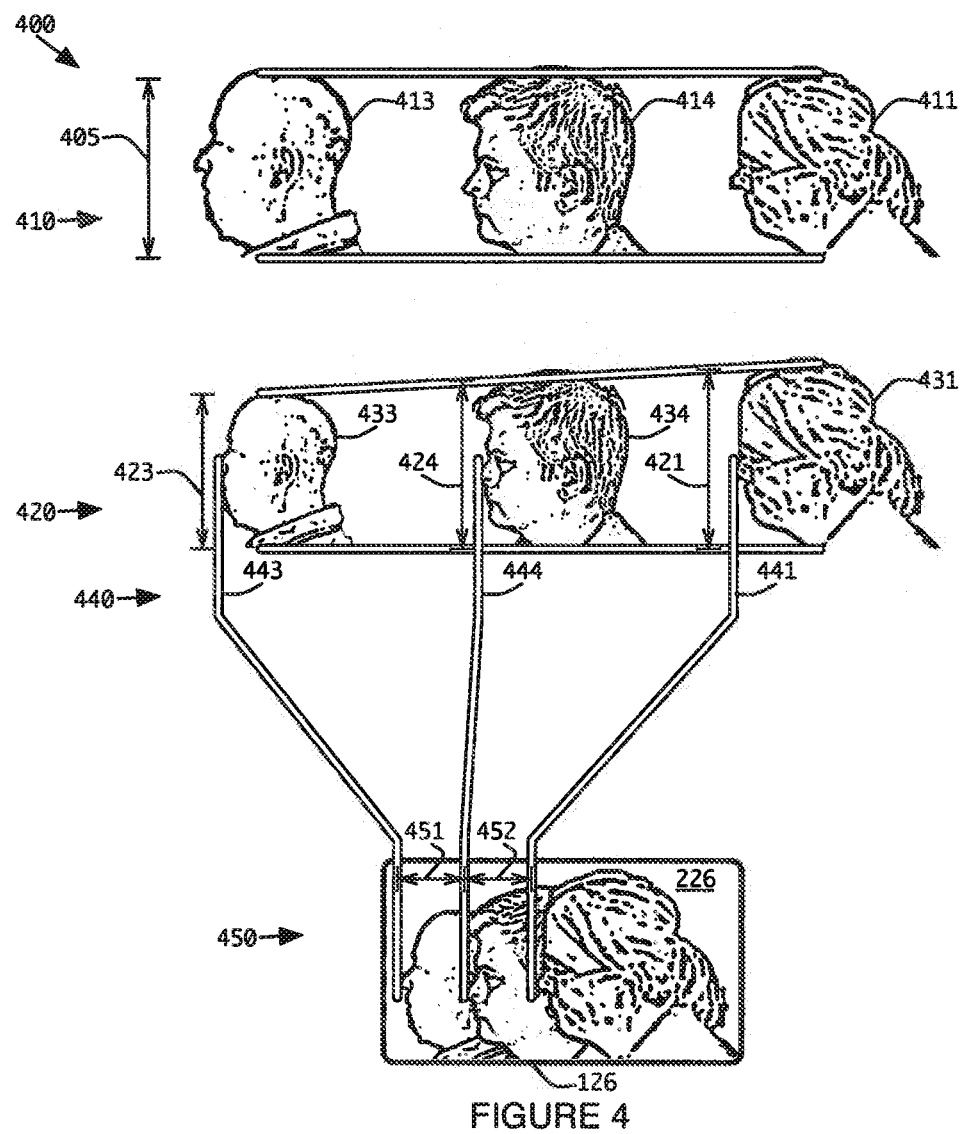
FIG. 4 shows a first set of images of remote participants composited into a single display.

Ultimately, the half-head height value, whether estimated or measured, serves to establish the scale factor of the participant image 373 when used in conjunction with other participant images for the head scaling and composition process 400, as shown in FIG. 4. Parameters other than half-head height value, such as eye spacing, or head width (e.g., as determined by the median width row in candidate region 366) could serve as well in place of the half-head height value. In some embodiments, where the telepresence system has knowledge of at least some participants, the system can make use of the participants' actual head heights and match the image to a template for that participant. In any of these cases, the normalization step 410 serves to produce normalized participant head images 411, 413, and 414, wherein each corresponding remote telepresence station receives the normalized head image of each local participant. Each normalized head image represents approximately the same normalized head height 405. For example, if the normalized head height 405 has a predetermined value of five hundred pixels tall, then head image 411 would result from resealing of a participant image (e.g., isolated participant image 373 of participant 113) by the scale factor of five hundred divided by double the half-head height 378 (in pixels). Thus if the half-head height 378 had a value of one hundred pixels, then the scale factor would equal 500/(2*100) or 2.5, so scaling up the participant image 373 by a factor of 250% could yield a corresponding normalized head image (like image 411). In cases where participant image 373 appears very large, the scale factor could have a value less than 100%, corresponding to a normalized head imaged obtained by scaling down the participant image by a corresponding amount.

In some embodiments, other methods or mechanisms can serve to isolate the participant image 373. For example, if telepresence camera 117 comprised a stereoscopic camera that produced a stereoscopic image pair, then an analysis of disparities between the left- and right-eye images could determine the position of the participant and distinguish the participant from the background objects 311, since in a stereoscopic image pair, the pixels corresponding to background objects 311 will have a more positive disparity than pixels corresponding to nearer objects, such as the participant. In another example, a 3D scanner such as the Kinect sensor for the XBOX 360 game system, both available from Microsoft Corp., Redmond, Wash., could serve to differentiate between the participant and the background. In still other embodiments, rather than distinguishing between the background and a participant, recognition of the participant could occur by fitting a 3D participant model to the 3D scan data (or disparity maps derived from a stereoscopic camera), where the participant model adequately matches the 3D scan data. In still another embodiment, a separate camera (not shown) collocated with the telepresence camera 117, but sensitive to the far infrared (far-IR), could serve to identify the participant 113 by heat signature. Employing a near-IR emitter (not shown) in conjunction with a near-IR camera could provide additional image information useful for differentiating between the participant and any background objects.

In another exemplary embodiment, the steps of the method of in FIG. 3, with or without the alternative mechanisms and methods discussed above, could serve to detect multiple participants within the field of view of the telepresence camera 117. Where the multiple participant images produce distinguishable candidate regions (not shown, but like region 366), then the local STB 111 could generate multiple local participant images 373 for separate transmission to the remote telepresence stations. Alternatively, the local STB 111 could composite such images locally and treat the composite image as a single participant image using techniques similar to those discussed herein. When the multiple participant images produce a merged candidate region where the two participants do not separate easily (not shown, but as would occur if the two local participants were sitting close together, or as might occur if a child were sitting on a parent's lap), then the candidate region would yield a multi-participant image used in lieu of the participant image 373. These multiple local participant situations could readily exist throughout this description, in place of the single local participant situation as previously described.

In the exemplary embodiment shown in FIG. 4, head scaling and composition process 400 (comprising steps 410, 420, 440, and 450) is shown as concerning station 120 and STB 121, thus the scaling of the remote participant heads 411, 413, and 414 occurring during the normalization step 410 takes place at each of the STBs 111, 131, and 141, all of which exist remotely relative to STB 121. The STB 121 receives each of images of the normalized participant heads 411, 413, 414 via the communication channel 101. Upon receipt of images at station 120 by STB 121, during the step 420 (referred to as the "perspecting" step for reasons that will become better understood hereinafter), each image of the normalized remote heads 411, 413, and 414 undergoes further resealing to fit on the telepresence display 126 of FIG. 1. Each of the remote participants is assigned to a different graphic layer, such that the participant assigned to the foremost layer does not get hidden by any other participant, but the participants assigned to deeper layers may get partially hidden by those participants on the higher (shallower) layers. In this example, the foremost participant image 431 gets scaled to 100% of the height 421. The participant image 434 on the next deeper layer gets scaled to 90% of the height 421, i.e., to height 424, and participant image 433 on the third layer gets scaled to 80% of the height 421, i.e., to height 423. In this way, the images of the remote participants can appear to be in perspective, hence the designation of step 420 as the "perspecting" step, During the translation step 440, the STB 121, applies a horizontal translation to each of the perspected remote participant images 431, 433, and 434. Note that each of the remote participant images may require and/or may have already undergone a horizontal flip, as discussed above and taught in the cited co-pending applications, herein incorporated by reference. In the case of the STB 121, the remote participant images should undergo display facing left. With the perspected remote participant images 431, 433, and 434 already having the correct leftward facing, the translation step 440 proceeds by identifying the leftmost column 443 of the least forward image 433 and then providing a translation into a position within image 226, near the left edge. Similarly, the leftmost column 444 of the next least-forward image 434 gets translated to appear within the image 226 rightward of the left edge of the least forward image 433 by a predetermined horizontal distance 451, where the predetermined horizontal distance 451 may have a value less than the width of the perspected remote participant image 433. Finally, in the case of the three remote participant images, the leftmost column 441 of the foremost image 431 undergoes a horizontal translation to appear within the image 226 rightward of the left edge of image 434 by the predetermined horizontal distance 452, where distances 451 and 452 approximately equal each other (or, alternatively, relate to each other by a scale factor, e.g., with distance 451 being 90% of the distance 452).

Finally, during the composition and display step 450, insertion of the three translated versions of perspected remote participant images 433, 434, and 431 into the image 226 occurs with the corresponding priority. The non-transparent pixels in images 434 will overwrite those from the image 433, and the non-transparent pixels in image 431 will overwrite those from either of images 433 and 434, resulting in presentation of the composite telepresence image 226, to the participant 123 on the telepresence monitor 126 of FIG. 1.

Figure 5:
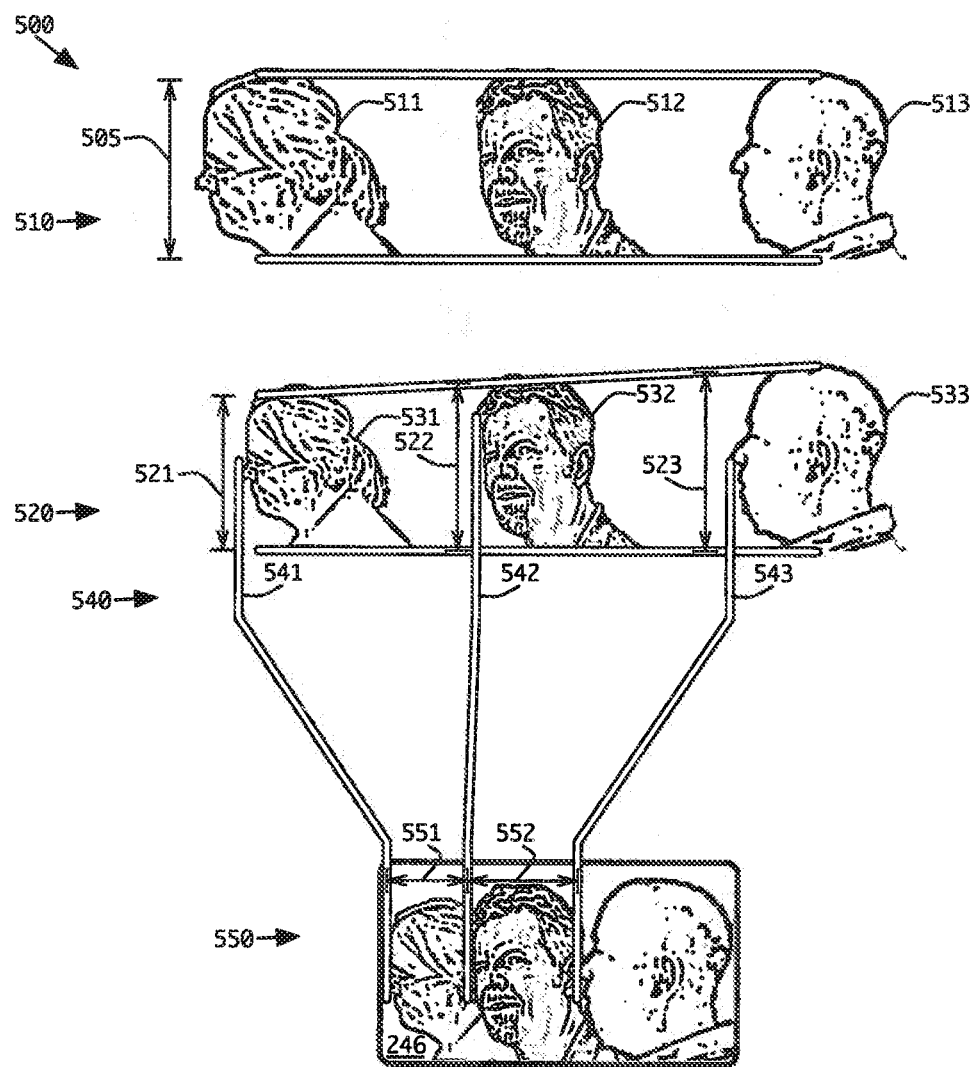
FIG. 5 shows a second set of images of remote participants composited into a single display.
Figure 6:
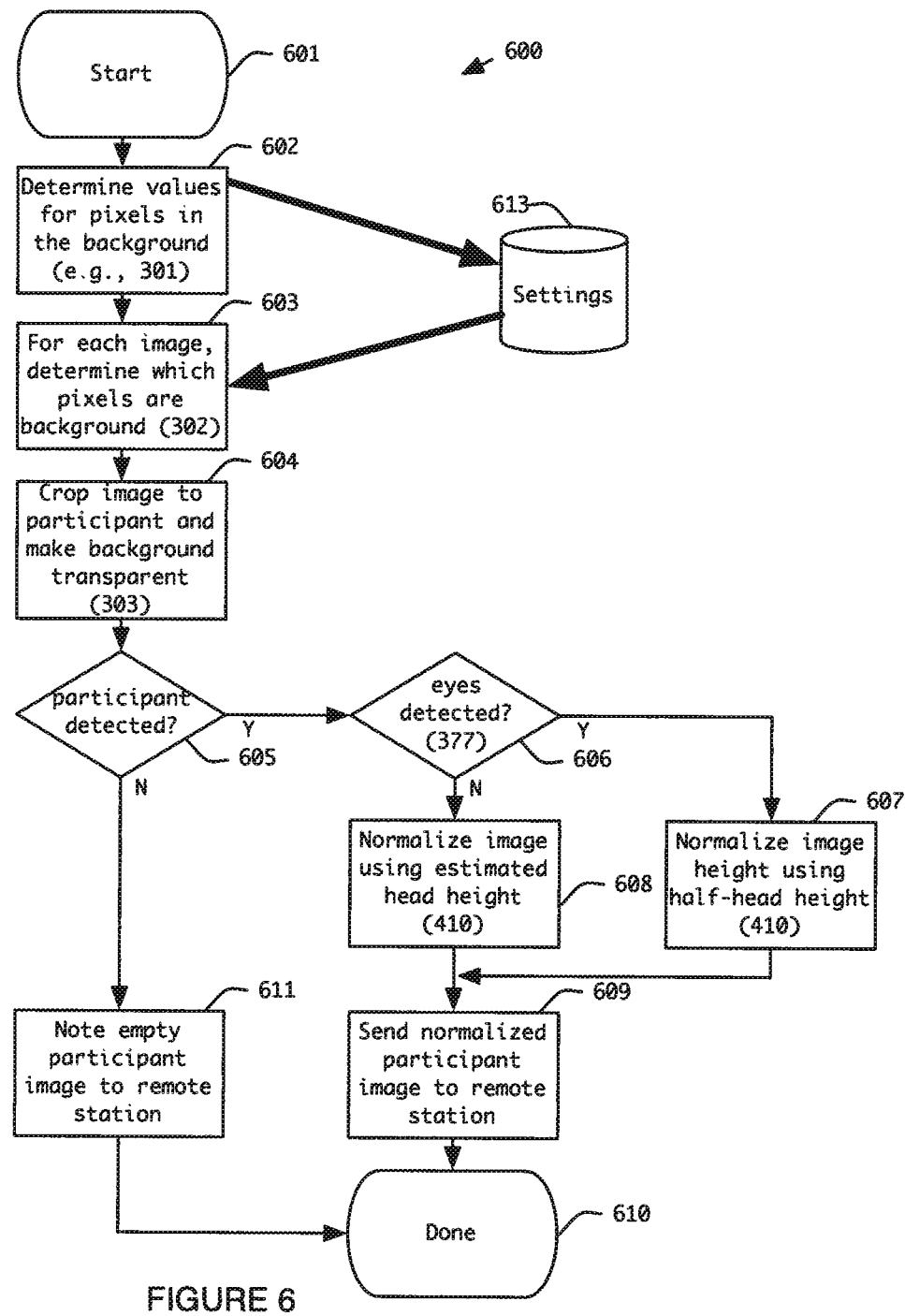
FIG. 6 depicts in flow chart form the steps of a method for compositing the images of remote participant into a single display.

FIG. 5 depicts a similar head scaling and composition process 500, made with respect to station 140 and STB 141, wherein the remote participant head images 511, 512, and 513 undergo normalization during step 510 to a height 505 (much as during the normalization step 410 of FIG. 4) at their respective STBs. The participant head images 511, 512, and 513 appear remote with respect to station 140, and undergo transmission via the communication channel 101 to STB 141. During the perspecting step 520, much as during perspecting step 420 of FIG. 4, the remote participant head images 511, 512, 513 undergo scaling, for example to produce: (a) the image 531 scaled to 80% of the full height 523, i.e., to height 521, (b) the image 532 scaled to 90% of the full height 523, i.e., to height 522, and (c) the image 533 scaled to 100%, i.e., full height 523.

During translation step 540, (much as during the translation step 440 of FIG. 4), the leftmost columns 541, 542, and 543 corresponding to perspected remote participant images 531, 532, 533 undergo identification and translation into positions within the image 246. However, in the case of the translation step 540, the STB 131 at the sending station 130 (both of FIG. 1) will tag the remote participant image 532 as facing the telepresence camera. Such a tag would result from detection by the STB 131 of an eye region (e.g., like detected eye region 377) in the corresponding participant image. In response to this tag, the spacing between the leftmost edges of the consecutive images to either side of image 532 during translation gets increased. This results in the least forward image 531 being translated further leftward during step 540 than the least forward image 433 during the step 440 of FIG. 4. Similarly, the foremost image 533 gets translated more rightward during step 540 than the foremost image 431 during step 440. Thus, either or both of the horizontal distances 551 and 552 become each larger than their counterparts 451 and 452, respectively, during step 450, thus offering the image of a remote participant facing the remote telepresence camera more screen space than when not facing the camera. If multiple participants turn to face their corresponding telepresence cameras simultaneously, the degree by which horizontal spacings 551 and 552 increase relative to their non-facing counterpart spacings 451 and 452, respectively, will get reduced such that if all participants face their telepresence cameras, the spacings may not increase at all.

The combined participant image isolation and normalization process 600 begins upon execution of step 601 during which, a local telepresence camera (e.g., telepresence camera 117) having a field of view of a portion of the corresponding station (e.g., station 110), supplies an image of that field of view to the local STB (e.g., STB 111). Recall that the local STB communicates via the communication channel 101 with one or more remote STBs (e.g., STBs 121, 131, and 141). During step 602, modeling of the background occurs (e.g., as during step 301, above) to yield a background image 310 which may undergo storage in the settings database 613 or elsewhere (not shown).

During step 603, the current image from the local telepresence camera (e.g., telepresence camera 117) undergoes analysis with respect to the background model (e.g., image 310) to identify that portion (if any) representing the local participant (e.g., 113) similar to step 302 discussed above with respect to FIG. 3. During step 604, the current image gets cropped to the region corresponding to the local participant 113, with any included pixels representing the background being made transparent. During step 605, if no region represents the local participant (e.g., 360), or if the region appears smaller than a predetermined size, then during step 611, the local STB (e.g., 111) sends message to the remote stations that no participant appears at that station (e.g., 110).

However, if during step 605, the STB (e.g., 111) detects a participant region of sufficient size (e.g., 366), then during step 606, the STB checks if it can find an eye region. If so, then during step 607, the local STB uses the location of the eye region (e.g., 377) within the participant region (e.g., 366) to determine the scale of the participant image, which gets enlarged, reduced, or left unchanged, as appropriate, to match normalized scale 405. However, if during step 606, the STB finds no eye region, then during step 608, the STB applies a default scale factor so the participant image matches the normalized scale 405, where the default scale factor can constitute one of (a) a predetermined value, (b) a scale factor identified during step 607 for a previous image, or (c) the normalized scale height 405 divided by the full height of the candidate participant region (e.g., the magnitude of the difference between 367T and 367B).

After the scaling occurring during either of steps 607 or 608, the local STB (e.g., 111) sends a normalized participant image (e.g., 411) to each remote station during step 609. The process ends at step 610, but repeats for each subsequent telepresence video frame, where subsequent iterations may begin at step 603, or in a modified step 602 (e.g., during which the background image 310 undergoes dynamic updating).

Note that in alternative embodiments, a portion of the image normalization may be performed by the remote stations, upon receipt. For example, participant detection, eye detection, and head-height estimations might be performed by the local STB, with the results sent with an un-normalized image to each remote STBs where, upon receipt, the remote STBs can perform the appropriate scaling. This might be advantageous if the images were being scaled up, as smaller images might be more economical to send. In still other embodiments, still more of the process 600 might be performed by the remote STBs.

As depicted in FIG. 2, the remote participant head images get "stacked" in each of the telepresence screen images 216, 226, 236, and 246 in an arbitrary order, here as if the stations were in positioned about a circle with consecutive positions arranged counterclockwise according to a hypothetical order in which the stations 110, 120, 130, and 140 joined the telepresence session (and as shown in FIG. 1). Thus, the local participant 113 at station 110 will see the remote participant images in the following order, the image 227 appears furthest away, the image 237 appears in the middle and the image and 247 appears foremost. The second participant 123 joining the telepresence session observes the remote image 237 furthest away, the remote image 247 in the middle and 217 foremost, and so on. Such an initial placement would give each participant approximately equal exposure or "proximity" to others upon joining.

The initial ordering on each telepresence screen is arbitrary. For example, a different ordering could have the image 217 of the first participant 113 appearing foremost on each of the remote telepresence screens 126, 136, 146 (in FIG. 2 this order exists only for the telepresence monitor 126 at station 120). Likewise, the second joining participant (here, 123) would appear as the next most forward image on remote telepresence screens other than that of the first participant. The last joining participant (here, 143) would appear as the furthest image on telepresence screens remote to him/her.

Figure 7:
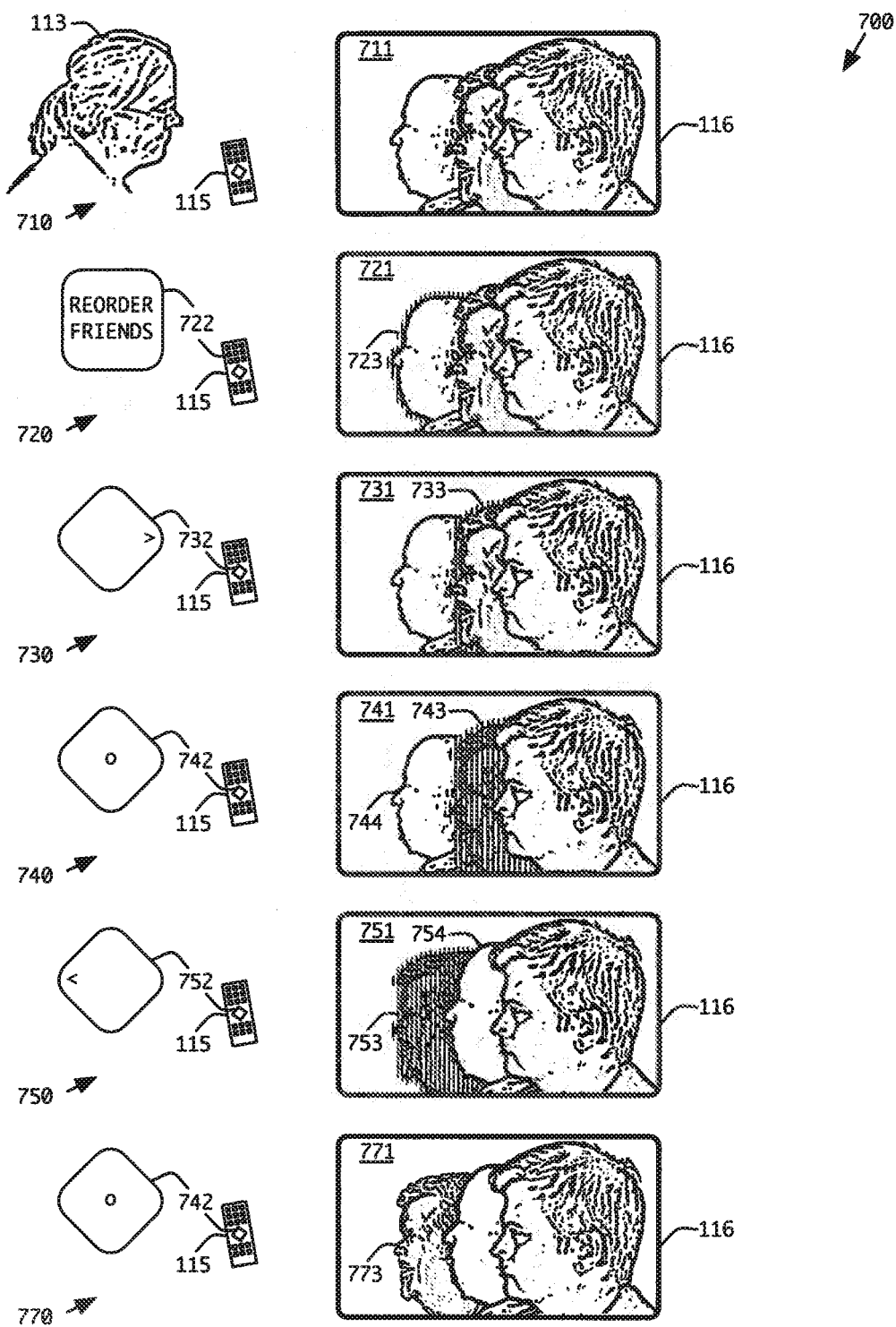
FIG. 7 depicts a sequence of images showing manipulation of the order of composing of the remote participant images.

Individual participants can have preferences different from the ordering provided by a default positioning algorithm, such as those described above. FIG. 7 illustrates a remote participant image order manipulation process 700 that the local participant 113 can control using his/her remote control 115. The processes commences step 710 during which the current order of remote participant images, represented by the composite telepresence image 711, undergoes display on the local telepresence monitor 116.

The local participant can reorder the images starting at step 720 by actuating a "reorder friends" button 722 on his or her remote control 115. In response to that action, the local STB 111 of FIG. 1 highlights an arbitrary one of the remote participant images, in this case remote participant image 723, as seen in the composite telepresence image 721 of FIG. 7. The local participant 113 can select a desired image for repositioning by actuating the arrow button 732 on the remote control 115 during step 730. In response, the STB 111 will update the display to highlight the next remote participant image, now image 733, as shown in the telepresence image 731 of FIG. 7. The local participant 113 will designate the currently highlighted remote participant image 733 as the desired participant image for re-positioning during step 740 by actuating the button 742 on the remote control 115. In response, STB 111 will display the middle remote participant image 743 of FIG. 7 as being selected, as shown in telepresence image 741.

With the head image 743 selected, the press of the left-arrow button 752 by the local participant 113 during 750 will cause the selected head image 743 to switch places with head image 744, which initially appeared to the left and further away than selected head image 743. As seen in the telepresence image 751, the selected head image 753 now appears leftmost and furthest, and head image 754 now appears in the selected head image's previous position. Note that perspective scaling has been updated for each of head images 753 and 754 from their prior values for head images 743 and 744, based on their new ordering. If the local participant 113 is satisfied with the new ordering, then during step 770 the local participant will press the select button 742 again, this time to unselect the head image 733, as shown in the telepresence image 771. Thereafter, the remote participant image order manipulation process 700 concludes.

Figure 8:
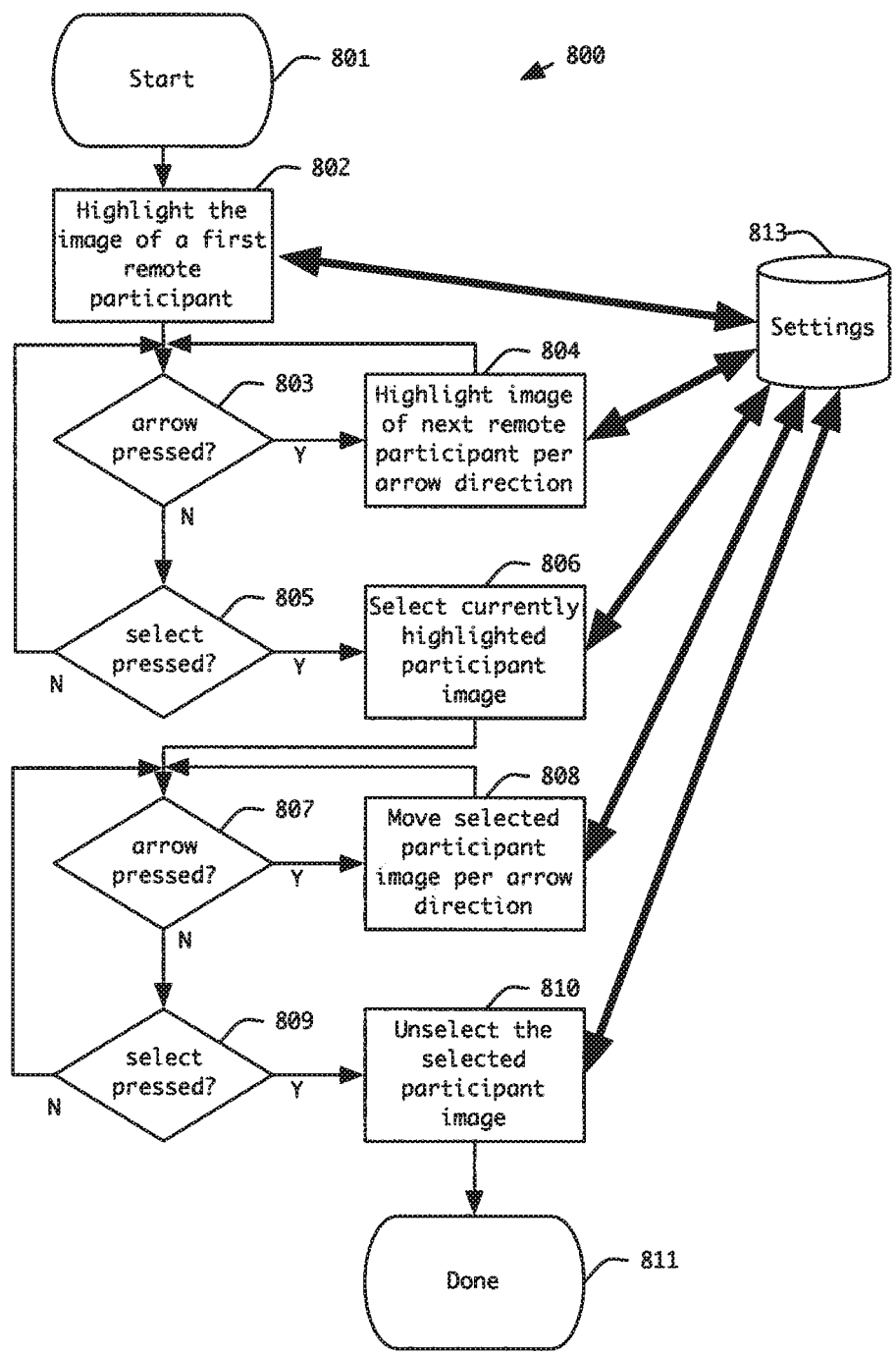
FIG. 8 depicts, in flow chart form, the steps of a method for manipulating the order of compositing of the remote participant images.

FIG. 8 depicts a flowchart for participant image order manipulation process 800, as one example, for implementing the image re-ordering process 700 of FIG. 7. The order manipulation process 800 begins at step 801, typically following actuation by the participant 113 of FIG. 1 of the "reorder friends" button 722 on remote the control 115. In response, the local STB 111 of FIG. 1 will highlight a first remote participant image, e.g., image 723, during step 802, The settings database 813 will store the various states (such as "highlighted", "selected", or "unhighlighted and unselected") and positions (e.g., "foremost", "next to foremost", . . . , "furthest") for each remote participant head image. During execution of this process to render the composite telepresence images (e.g., 711, 721, 731, 741, 751, 761, 771), the local STB will make use the states as recorded in the settings database 813 to direct the composition and rendering of the individual remote participant images. As described in the cited co-pending applications incorporated by reference herein, the settings database 813 will also record whether an individual remote participant image requires a horizontal flip.

During steps 803 and 805, the STB expects an input from the remote control 115. If the participant 113 presses an arrow key (e.g., the arrow key 732 or 752), then during step 804, the highlight moves from one remote participant head image to another, according to the direction of the arrow. This may recur upon each actuation of the arrow key until the local STB 111 detects actuation of the select key 742 during step 805 of FIG. 8, at which point, during step 806, the currently highlighted remote participant image (e.g., image 733) becomes the selected remote participant image (e.g., image 743).

Once the local participant 113 selects a remote participant head image, then during steps 807 and 809, the STB will expect another input from the remote control 115. If the participant 113 actuates an arrow key again (e.g., the arrow key 732 or 752), then during step 808, the STB changes the position of the selected remote participant image in accordance with the arrow direction, for example, moving the participant head image moved further away (e.g., for arrow key 752). The state (including horizontal position, perspective scaling, and priority) of other non-selected remote participant images (e.g., image 744) may undergo modification (e.g., as in image 754) to produce a composite telepresence image (e.g. image 751) consistent with the commands from the remote control. This change in position may recur with each arrow key pressed by the local participant 113, until the STB 111 detects a second actuation of the select key 742 during step 809. In response, step 810 undergoes execution, whereupon the STB 111 sets the selected remote participant image to an unselected and unhighlighted state (e.g., image 773). The manipulation process 800 concludes at step 811.

Figure 9:
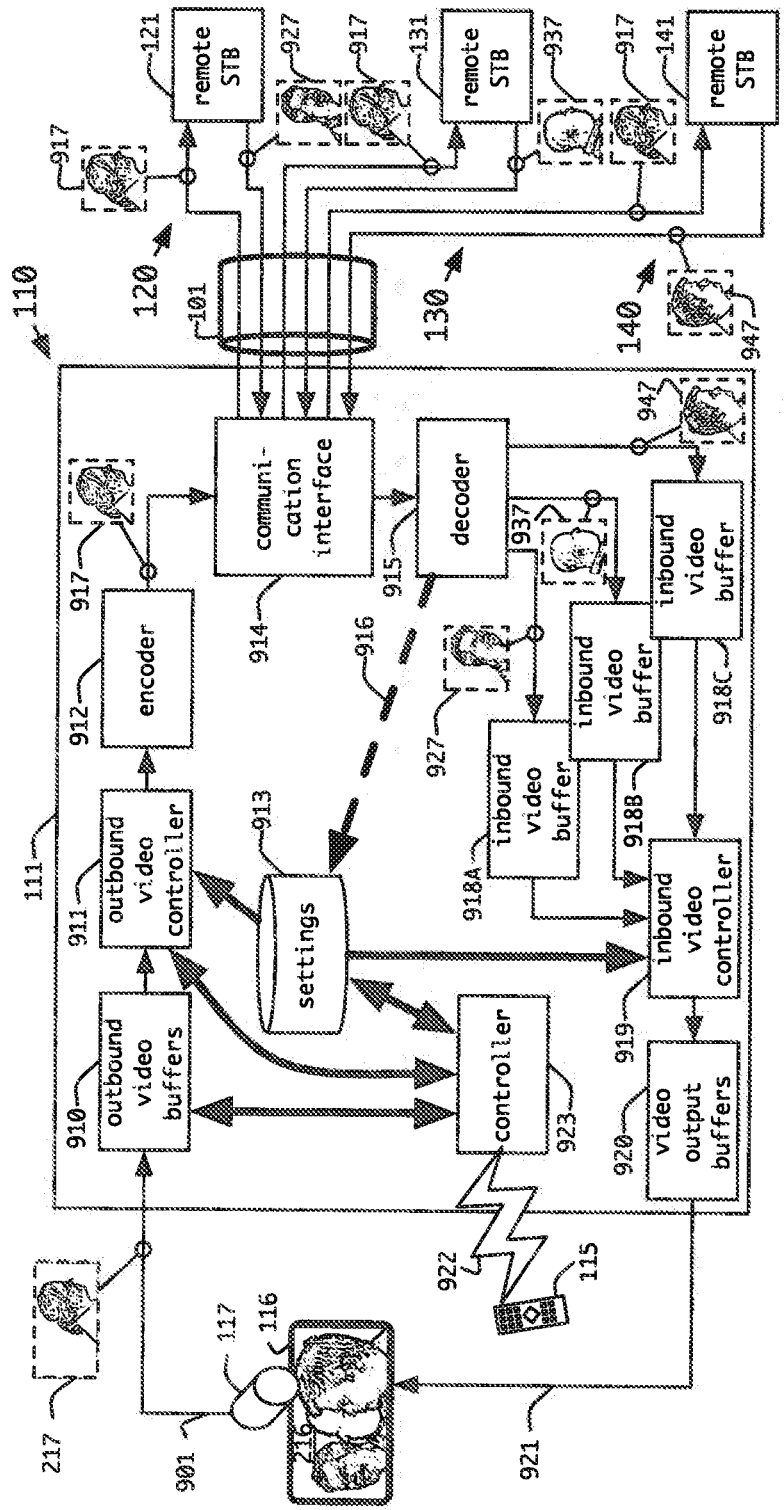
FIG. 9 depicts a block schematic diagram of a set-top box for controlling activity at a station in the telepresence system of FIG. 1, the set-top box being one exemplary embodiment suitable for the present invention; and, FIG. 10 depicts a sequence of images associated with replacing the video feed from a remote participant when that remote participant exits the field of view of the remote telepresence camera.

FIG. 9 shows a block schematic diagram of an implementation of the STB 111 of FIG. 1. The telepresence camera 117 provides an output signal 901 embodying the local participant image 217 (which may contain background information). A set of one or more outbound video buffers 910 in the STB 111 store the images embodied in the camera output signal 901. The term "outbound" when used in connection with the video buffers 910 reflects that the images stored in such buffers ultimately undergo transmission to the remote telepresence stations. An outbound video controller 911, under the control of a master controller 923, processes the images stored in video buffers 910. Such processing can include performing the background modeling that occurs during the step 301 of FIG. 3, local participant isolation, as occurs during step 302 of FIG. 3, and detection of eye region 377 in step 303. From information learned during the execution of these steps (e.g., the extents 367T/R/L/B and the half-head height 378), the controller 923 instructs an outbound video controller 911 to transfer a portion of the local participant image (e.g. the image 373) to an encoder 912 which generates an outbound participant image 917. The encoder 912 can also provide ancillary information about the outbound participant image 917. Such information can indicate whether the image 917 contains a participant image (e.g., as known from the image 363) or not (e.g., as known from the image 360), and whether or not the STB detected the eye region 377, and if so, then where the eye region is (e.g., the value for half-head height 378). The remote STBs can use such additional information when compositing the outbound participant image with images of other participants such as during steps 450 and 550 of corresponding head scaling and composition processes 400 and 500, respectively, of FIGS. 4 and 5, respectively.

Note that the outbound video controller 911 may use other information from the settings database 913, to determine whether or not the local participant image needs horizontal flipping. In this exemplary embodiment, the STBs 111, 121, 131, and 141 adhere to a convention wherein the STBs exchange participant images with a facing as if the sending STB's participant image originated from a telepresence camera lying to the right of the corresponding shared content monitor. Since telepresence camera 117 actually does lie to the right of the shared content monitor 112 at station 110 of FIG. 1, the image from that telepresence camera requires no flipping prior to transmission as the outbound local participant image 917 with respect to local participant image 217.

A communication interface 914 within the STB 111 of FIG. 9 relays the outbound participant image 917 to the communication channel 101 for transmission to each of remote STBs 121, 131, and 141 at corresponding stations 120, 130, and 140, respectively. The STB 111 receives corresponding inbound remote participant images 927, 937, and 947 (of which, 937 was horizontally flipped with respect to original image 237 by remote STB 131) via the communication channel 101, at a communication interface 914, which passes the received images to a decoder 915. The decoder 915 parses out each of the inbound remote participant images 927, 937, and 947 (or processed versions thereof, e.g., if any of the images had undergone encoding), to a set of inbound video buffers 918A, 918B and 918C, respectively. f the decoder 915 detects information provided with or about the images 927, 937, and 947, the decoder will send such information 916 to the settings database 913. Examples of such information may include messages as to whether a remote STB detected the presence of a participant during handling of the remote participant image, or the remote STB detected the eye region 377, and in some embodiments, where that STB detected the eye region. In some embodiments, the scale factor appropriate to the participant image may be provided (e.g., in lieu of the participant image having been scaled prior to sending).

Based on the information stored in the settings database 913, an inbound video controller 919 can determine where to position each inbound participant head image and in what order, as well as whether to flip such images horizontally (as would be the case for all three in the present example of the station 110 and STB 111), and with what spacing. The inbound video controller 919 places remote the participant image data from each of the inbound video buffers 918A, 918B and 918C into the appropriate position in a video output buffer 920, which generates an inbound telepresence video signal 921 carrying the composite telepresence image 216 to telepresence monitor 116 for display.

Figure 10:
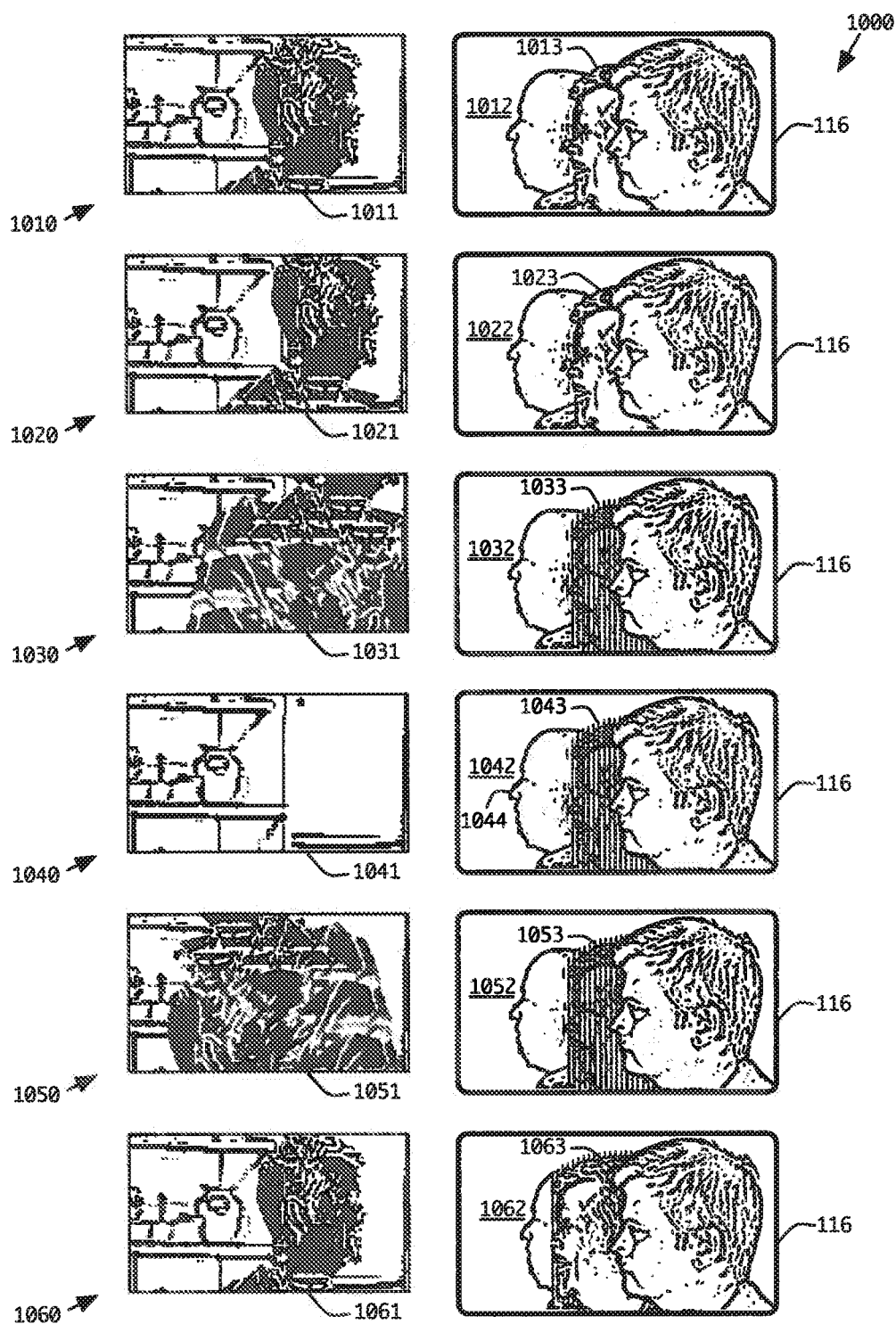

In some exemplary embodiments, an STB may periodically record an image of each remote participant, in case a remote participant leaves the field of view of his/her corresponding telepresence camera. This recorded image would provide a placeholder image for the remote participant, until he or she returns. FIG. 10 illustrates such a placeholder substitution process 1000. The process 1000 commences upon execution of step 1010 during which the local STB (e.g., STB 121) analyzes the local participant difference image 1011 to determine whether the extent of the local participant image remains within its frame. If so, the outbound participant image 1013 undergoes transmission to the remote STBs (e.g., 111) for inclusion in the composite telepresence image (e.g., 1012) on the remote telepresence screen (e.g., 116, where outbound participant image 1013 appears horizontally flipped).

During step 1020, the local STB detects whether the local participant difference image 1021 exhibits a substantial "opposite edge violation", where the local participant image has undergone cropping at both the top and the bottom by the field of view (whereas, during step 1010, the difference image 1011 exhibits cropping of the participant image only at the bottom). The local STB 121 automatically detects this condition, causing the local STB to interrupt the real-time video feed of the local participant image and replace it with the most recently stored local participant image, e.g., image 1013, which does not exhibit the top and bottom cropping of difference image 1021. Thus, during step 1020, the remote telepresence screen 116 will display the composite telepresence image 1022 with the still image 1023 derived from the earlier participant image 1013. The remote participant images displayed in the composite image 1022, other than participant image 1023, remain as live, real-time video throughout this process.

In an alternative embodiment, the STB can make use of criteria in addition to, or in place of the opposite edge violation to trigger the freeze frame of the outbound participant image. For example, the STB can make use of a frame count, where the opposite edge violation must continue for at least a predetermined amount of time (e.g., one second) before a stored participant image is used. Alternatively, the STB could determine that the size of the top edge violation must equal or exceed a certain width (e.g., a raised arm might not be wide enough, nor a peak of hair, but having the head image cropped to the forehead would be sufficient). When applying the "certain width" criteria to trigger the freeze-frame condition during step 1020, the STB could derive the width from, or scale the width to, the size of the participant image determined before the opposite edge violation. For example, the STB could record the minimum width found for the fully processed candidate region (e.g., region 366) below the midpoint of the candidate region, and use that value as a proxy for the "participant neck width". Thus, until the cropping of a participant's head results in a truncated flat area at least as wide as the participant's neck, the STB would maintain the real-time participant image, albeit with the top of the head flattened by the cropping due to the participant's position in the field of view.

If during step 1030, the local participant exits the field of view, the local STB 121 will generate a candidate region in difference image 1031 substantially unlike a participant silhouette. Whether due to a detection of this condition, or due to the freeze frame state of step 1020 being sustained for more than a predetermined amount of time (e.g., five seconds), the freeze-frame participant image 1033 in telepresence composite image 1032 undergoes modification to indicate the freeze-frame state. For example, the local STB 121 could make the freeze-frame image 1033 partially transparent by, making the stored participant image being sent to remote STBs appear as a ghost. Alternatively, local STB 121 could dim the freeze-frame image 1033 being sent, for example, by graphically applying a translucent gray smoke to reduce the contrast relative to the unprocessed freeze-frame image 1023. This would leave the identity of the remote participant recognizable, but clearly indicate that the participant may not be telepresent, that is, may not be within view of or earshot of his telepresence station. By making this situation visibly clear, a participant will have a greater understanding why another participant seems unresponsive. In alternative embodiments, the partial transparency or graying of remote participant image 1033 may be imposed by the receiving remote STBs (e.g., 111) before display in composite image 1032.

During step 1040, the difference image 1041 yields no candidate region as the local participant resides wholly outside the field of view. In some embodiments, the STB 121 could specifically detect this condition and use this information instead of other criteria for triggering a freeze-frame of an earlier-captured local participant image. In still other embodiments, criteria such as the detection of the lack presence of the participant, whether or not used in conjunction with a timer, can serve to trigger a "participant has left the vicinity" chime or other audible indication to remote participants to warn that a participant has left the vicinity of his or her corresponding telepresence station. In the composite telepresence image 1042, the processed freeze-frame image of the absent participant 1043 exists as a still image the other participant images (e.g., 1044) remain as live, real-time video.

During step 1050, the candidate region in difference image 1051 no longer remains empty, which, when detected, can serve as a criterion to trigger a "participant has returned within earshot" chime or other audible indication. The composite telepresence image 1052 still shows the processed freeze-frame 1053. In some embodiments, the processing of freeze-frames 1033 and 1053 (where the participant appears, but his or her image does not appear well framed) may differ from the processing of freeze-frame 1043 (where the participant does not appear at all). For example, the STB 121 could lower the contrast of the processed freeze-frames 1033 and 1053, but when the participant appears absent, the STB 121 could make the processed freeze-frame 1043 further fractionally transparent. In some embodiments, the degree of transparency may increase the longer the participant remains absent (up to some maximum transparency). In some embodiments, after a prolonged absence (e.g., 10 minutes) such as during step 1040, the receiving STB 111 could drop the absent participant from the telepresence session entirely (not shown).

During step 1060, the difference image 1061 produces a qualified candidate area (e.g., as at area 363 in FIG. 3) without opposite edge violations. In response, the STB 121 will replace the freeze-frame participant image with a live, real-time outbound participant image 1063 (shown as horizontally flipped in composite telepresence image 1062). To call attention to the fact that the participant image 1063 has just returned to a real-time status, the STB could provide an audible chime or brief highlight (shown around participant head image 1063).

In some embodiments, the detection of a participant becoming absent, as discussed in conjunction with step 1040, could trigger the shared content playing on monitors 112, 122, 132, and 142 to automatically and synchronously pause. In this way, no participant needs to intervene manually, e.g., by using remote controls 115, 125, 135, and 145, to stop the content play out. The shared content may automatically resume play out in synchronism at all of the stations 110, 120, 130, and 140 once the absent participant returns to within earshot (e.g., step 1050), or the absent participant has resumed a qualified position (e.g., step 1060), that is, the participant has taken his or her seat. Of course, impatient participants may not wait for the participant to reappear. Any impatient participant could use his or her corresponding remote control to command the system 100 to continue play out of the shared content. Alternatively, the participant departing during step 1030 may command the system 100 to continue in his or her absence (e.g., by using his or her remote control to command the system to keep playing).

In a system where the STB 121 can recognize a participant's gestures, the departing participant might signal the telepresence system to keep playing out content with a hand gesture. For example, a departing participant could signal his or her STB by a hand with index finger pointed at the shared content monitor moving in a clockwise orbit perpendicular to the pointed finger, a gesture used typically used in filmmaking and in some sports activities to indicate a "keep rolling" command or a "keep the game clock running" command. Such a gesture can signal the local STB to continue content play out even if the STB has detected departure of the local participant. The STB 121 will typically remain in this state until expiration of a predetermined interval. In other words, if after the local participant gives the "keep rolling" gesture, should the local participant not leave within 30 seconds, the STB will disregard the "keep rolling" gesture. If, however, if the local participant does leave within this interval, then the state initiated by the keep rolling gesture prevents the shared content from pausing.

In embodiments where multiple local participants (not shown) may appear at any of the stations 110, 120, 130, and 140, then when placeholder substitution process 1000 detects a departing or absent participant (e.g., steps 1020-1040), in the case of multiple local participants, the video may remain live if fewer than all of the local participants have departed. However, the shared content may automatically pause when one or more of the multiple local participants depart, and automatically resume once all of the multiple local participants have returned and taken their seat. In this way, for example an hour into a movie, everyone can agree to take a break, with the system automatically pausing until all the participants (including the multiple local participants at a particular station) have returned. Other policies fall within the consideration of this technique: For example, if well into a shared content presentation an additional local participant joins with another local participant, and within a few minutes decides that this shared content does not interest him or her, then departure of the recently added participant might not trigger an automatic pause of the shared content. Such a policy might include parameters such as how much viewing a of a piece of shared content by an individual participant constitutes an investment by that participant into the presentation, such that upon that participant's departure being detected a pausing of the shared content becomes warranted. That is, the investment of four telepresence participants at the onset of a shared content program is equal. Sometime later, a fifth participant joins as an additional participant a one of the locations. After a certain amount of time, e.g., 25% of the time invested by the other participants, or 15-minutes, whichever is less, the additional participant could be considered as having an investment equal to the others, at which point a departure by the additional participant would induce an automatic pause by the shared content telepresence system 100.

The foregoing describes a technique for adjusting the display of participants in a telepresence system in which participants can share content along with the sharing of images of themselves.

The invention claimed is:

1. A method of processing data at a local station to produce data representing images of participants at remote stations, comprising the steps of:
    receiving at the local station data representing the images of the participants at the remote stations and data indicating facings of the participants at the remote stations with respect to cameras at the remote stations;
    processing at the local station the data representing the images of the participants at the remote stations to isolate the participant in the image from image background;
    merging, at the local station, data representing the processed images of the participants at the remote stations to generate data representing an output image in which a first processed participant image appears to partially overlay a second processed participant image and in which the first processed participant image appears in the output image horizontally translated relative to the second processed participant image by a distance determined in response to the data indicating the facings of the first and second participants; and
    providing the data representing the output image at an output of the local station suitable for coupling to a display device.

2. The method according to claim 1 wherein the receiving step comprises:
    accepting from the remote stations images of participants already processed to isolate the participant in the image from image background.

3. The method according to claim 1 further including the step of normalizing the first and second processed participant images in height.

4. The method according to claim 3 wherein the normalizing occurring in accordance with a distance from the top of a participant's head to a centerline of the participant's eyes in the image of the participant at the remote station.

5. The method according to claim 1 further including the step of scaling at least one of the processed participant images to cause the second processed participant image to appear smaller than the first processed participant image, whereby the second processed participant images appears further away due to perspective.

6. The method according to claim 1 wherein the distance the first processed participant image appears in the output image horizontally translated from the second processed participant image has a first value when at least one of the participants in the first and second processed participant images has a first facing and has a second value less than the first value otherwise.

7. The method according to claim 1 wherein at least one of the processed participant images is horizontally flipped with respect to the corresponding image of the participant at the remote station.

8. The method according to claim 1 further comprising the step of:
    accepting an ordering of remote participants from a local participant,
    whereby a local participant can select which of the remote participants corresponds to the first and second processed participant images.

9. Apparatus comprising:
    an input buffer receiving and storing data representing images of a plurality of participants, each at one of a plurality of remote stations, and to receive and store data representing facings of the participants at the remote stations with respect to cameras at the remote stations;
    a video controller coupled to the input buffer and processing the data representing the images to isolate the participant in the image from the image background and to generate data representing an output image in which a first processed participant image appears to partially overlay a second processed participant image and in which the first processed participant image appears in the output image horizontally translated relative to the second processed participant image by a distance determined in response to the data indicating the facings of the first and second participants; and
    an output buffer coupled to the video controller and storing the data representing the output image and supplying the data representing the output image at an output suitable for coupling to a display device.

10. The apparatus according to claim 9 wherein the images stored in the input buffer have already undergone processing to isolate the participant in the image from image background.

11. The apparatus according to claim 9 wherein the video controller processes the data representing the first and second processed participant images to normalize the first and second processed participant images in height.

12. The apparatus according to claim 11 wherein the video controller processes the data representing the first and second processed participant images to normalize the first and second processed participant images in height in accordance with a distance from the top of a participant's head to a centerline of the participant's eyes in the image of the participant at the remote station.

13. The apparatus according to claim 9 wherein the video controller processes the data representing the first and second processed participant images to scale the second processed participant image to appear smaller than the first processed participant image, whereby the second processed participant images appears further away due to perspective.

14. The apparatus according to claim 9 wherein the distance the first processed participant image appears in the output image horizontally translated from the second processed participant image has a first value when at least one of the participants in the first and second processed participant images has a first facing, and has a second value less than the first value when the at least one participant has a second facing.

15. The apparatus according to claim 9 wherein the video controller processes the data representing at least one of the first and second processed participant images to horizontally flip the at least one of the processed participant images with respect to the corresponding image of the participant at remote station.

16. The apparatus according to the claim 9 wherein the video controller processes the data representing the first and second processed participant images to alter an ordering for the first and second processed participant images responsive to a command from a local participant to select which of the remote participants corresponds to the first and second processed participant images.

17. The method of claim 1 wherein any of one of the first and second processed participant images serves as a placeholder image for at least a portion of time corresponding to the participant being out of view at the corresponding remote station.

18. The method of claim 17 wherein the placeholder image constitutes a freeze frame of the corresponding participant.

19. The method of claim 18 wherein the freeze frame undergoes processing to further indicate status of the corresponding participant.

20. The apparatus according to claim 9 wherein one of the images of the plurality of participants constitutes a placeholder image for at least a portion of a time that the corresponding participant is out of view at the corresponding remote station.

21. The apparatus according to claim 20 wherein the placeholder image constitutes a freeze frame of the corresponding participant.

22. The apparatus according to claim 21 wherein the freeze frame undergoes processing to further indicate the status of the corresponding participant.

\* \* \* \* \*